US012339818B2

(12) United States Patent
Macneill et al.

(10) Patent No.: US 12,339,818 B2
(45) Date of Patent: Jun. 24, 2025

(54) USE OF MACHINE LEARNING AND ARTIFICIAL INTELLIGENCE IN EXISTING DATA SETS TO PLAN FOR FUTURE PLUG AND ABANDON, RE-USE AND DECOMMISSIONING ACTIVITIES

(71) Applicant: DWA CONSULTANTS-FZCO, Duba (AE)

(72) Inventors: David Macneill, Dubai (AE); Nigel M. Lakey, Houston, TX (US); Callaghan Keith Wilmott, Alberta (CA)

(73) Assignee: DWA CONSULTANTS-FZCO, Dubai (AE)

( * ) Notice: Subject to any disclaimer, the term of this patent is extended or adjusted under 35 U.S.C. 154(b) by 0 days.

(21) Appl. No.: 18/426,482

(22) Filed: Jan. 30, 2024

(65) Prior Publication Data

US 2024/0264988 A1 Aug. 8, 2024

Related U.S. Application Data

(60) Provisional application No. 63/442,924, filed on Feb. 2, 2023.

(51) Int. Cl.
*G06F 16/215* (2019.01)
*G06F 16/22* (2019.01)

(52) U.S. Cl.
CPC ........ *G06F 16/215* (2019.01); *G06F 16/2282* (2019.01)

(58) Field of Classification Search
CPC ............................ G06F 16/215; G06F 16/2282
USPC ........................................................ 707/692
See application file for complete search history.

(56) References Cited

U.S. PATENT DOCUMENTS

| 9,092,802 | B1 | 7/2015 | Akella |
| 11,880,394 | B2 * | 1/2024 | Zamfir .................. G06Q 40/03 |
| 2020/0027019 | A1 | 1/2020 | Yang et al. |
| 2020/0257943 | A1 | 8/2020 | Huber et al. |

(Continued)

FOREIGN PATENT DOCUMENTS

WO 2021252416 A1 12/2021

OTHER PUBLICATIONS

International Search Report/ Written Opinion issued to PCT/US2024/013586 on Apr. 19, 2024.

*Primary Examiner* — Cam Linh T Nguyen
(74) *Attorney, Agent, or Firm* — Patterson + Sheridan, LLP

(57) ABSTRACT

Techniques for determining one or more attributes in relation to transitional activities for a client well are provided. Embodiments include receiving structured data and unstructured data related to a well from one or more data sources and extracting, from the structured data and the unstructured data related to the well, numerical features, text features, and categorical features. Embodiments include generating embeddings based on the text features and generating encoding vectors based on the categorical features. Embodiments include providing, as inputs to one or more machine learning models, the numerical features, the embeddings, and the encoding vectors. Embodiments include receiving, as outputs from the one or more machine learning models in response to the inputs, one or more predicted values related to one or more transitional activities for the well. Embodiments include generating, based on the one or more predicted values, a transitional recommendation for the well.

17 Claims, 7 Drawing Sheets

(56) References Cited

U.S. PATENT DOCUMENTS

| | | |
|---|---|---|
| 2021/0256671 A1 | 8/2021 | Guner et al. |
| 2021/0389491 A1 | 12/2021 | Maucec et al. |
| 2021/0396135 A1 | 12/2021 | Knight et al. |
| 2022/0237934 A1* | 7/2022 | Matcham ............... G06F 18/285 |
| 2023/0096474 A1* | 3/2023 | Krishnan ............. G06N 3/0464 |
| | | 726/26 |
| 2023/0118240 A1* | 4/2023 | Wong ................. G06Q 20/4016 |
| | | 705/44 |
| 2023/0212937 A1* | 7/2023 | Pang .................... E21B 47/008 |
| | | 166/250.01 |
| 2024/0006080 A1* | 1/2024 | Molero Leon ......... G16B 20/40 |
| 2024/0176951 A1* | 5/2024 | Krishnamoorthy ......................... |
| | | G06V 30/1465 |

* cited by examiner

USE OF MACHINE LEARNING AND ARTIFICIAL INTELLIGENCE IN EXISTING DATA SETS TO PLAN FOR FUTURE PLUG AND ABANDON, RE-USE AND DECOMMISSIONING ACTIVITIES

CROSS-REFERENCE TO RELATED APPLICATION(S)

This application claims benefit of and priority to U.S. Provisional Patent Application Ser. No. 63/442,924, filed Feb. 2, 2023, herein incorporated by reference in its entirety as if fully set forth below and for all applicable purposes.

BACKGROUND

A well may be formed through the surface of the earth to a subterranean feature, such as a formation, a dome, or a fracture, and a wellbore structure constructed and maintained to provide access to the feature from the surface. The wellbore may then be utilized for a variety of well appreciated reasons, including, but not limited to, accessing fluids in a subterranean formation to bring the fluids to the surface, such as water, brine, and hydrocarbons; injecting fluids into the earth, such as carbon dioxide, fluidized wastes and formation fluids for disposal; and for the generation of power or provision of heat via geothermal processes. The maintenance and use of a wellbore may be continuous or discontinuous for years, even decades. Further, while a wellbore may have been constructed and operated for an initial purpose—such as the production of hydrocarbons—technical or business conditions can lead to a decision where the purpose and use of the wellbore is changed.

Over the lifecycle of a wellbore—from first planning of the subterranean structure, through construction, its use for a period, refurbishment and repair, re-use or re-purposing, and finally ultimate discontinuation of its use—millions of potential points of data may be generated. In the modern era, much of this data resides in storage digitally; however, there are many wells—even modern ones—where data is accumulated and kept in a physical format, such as on a paper form or in a daily log book. Processing such data (whether in digital or physical form) in order to automatically draw useful conclusions is a challenging task for a variety of reasons, such as the large volume of data, the complexities of relationships among data points (which are generally not known by such automated processes), the differences between wells, the differences in data formats, and the like.

SUMMARY

A system for automatically determining one or more attributes in relation to plugging and abandonment (P+A) or re-purposing activities for a client well is provided.

A non-transitory tangible computer-readable storage medium having stored executable computer code, the computer code comprising a set of instructions that causes one or more processors to perform the following operations for determining one or more attributes in relation to plugging and abandonment (P+A) or re-purposing activities for a client well is provided.

A computer-implemented method executed by one or more processors for determining one or more attributes in relation to plugging and abandonment (P+A) or re-purposing activities for a client well is provided.

BRIEF DESCRIPTION OF THE DRAWINGS

So that the manner in which the recited features of the present disclosure may be understood in detail, a more particular description of the disclosure may be had by reference to one or more embodiments, some of which are illustrated in the appended drawings. It is to be noted, however, that the appended drawings illustrate only one or more of the several embodiments; therefore, the one or more embodiments provided in the Drawings are not to be considered limiting of the broadest interpretation of the detailed scope. Other effective embodiments as may be described in the Detailed Description may be considered part of the envisioned detailed scope.

Figure 1:
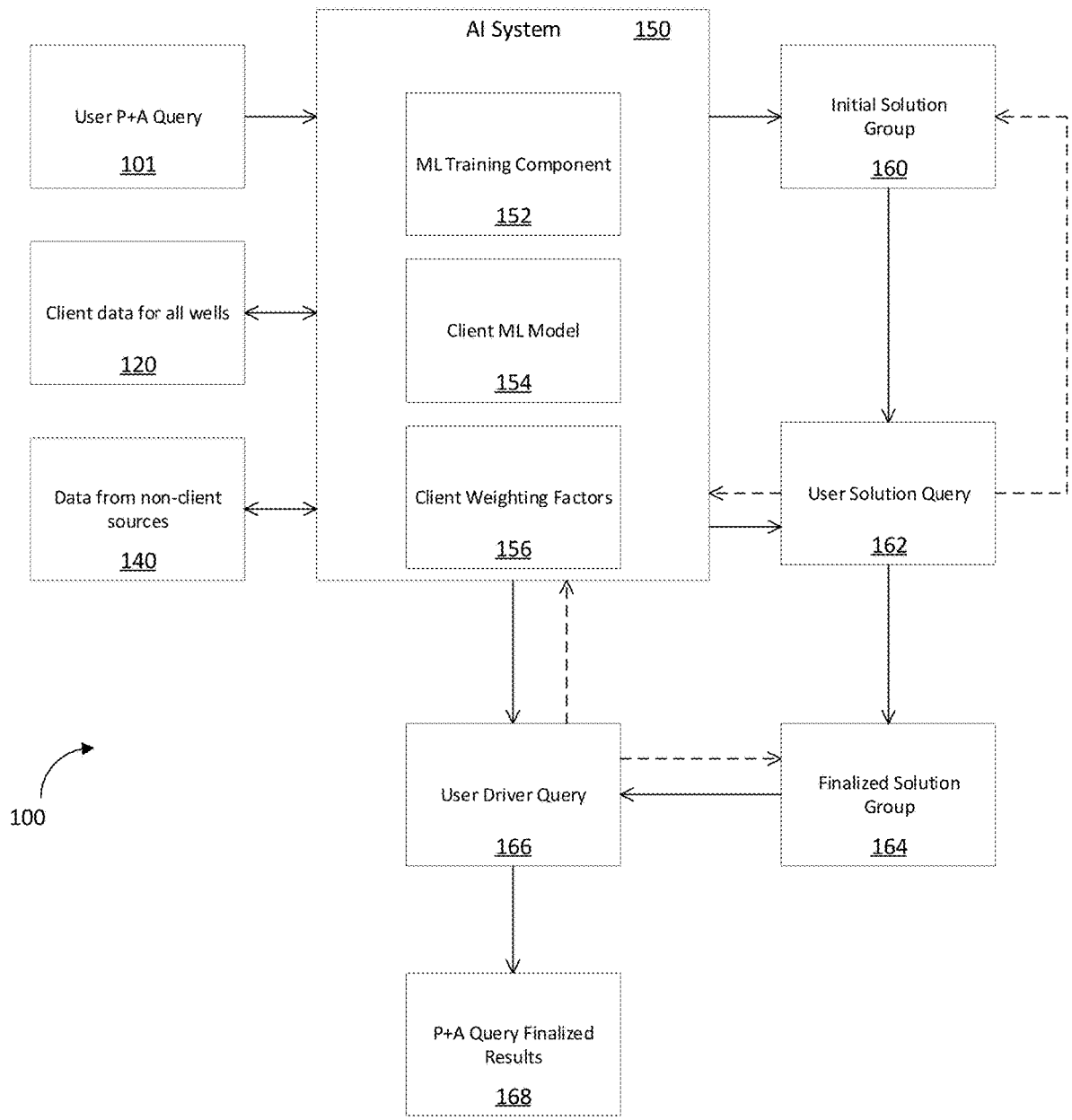
FIG. 1 depicts a schematic diagram of an artificial intelligence (AI) system regarding transitional activities for a wellbore (e.g., P+A, re-use, repurposing, and/or other transitional activities) that may be useful in performing ranking and estimation operations based upon a client query, according to one or more embodiments.

In this disclosure, the terms "top", "bottom", "side", "above", "below", "up", "down", "upward", "downward", "horizontal", "vertical", and the like do not refer to absolute directions. Instead, these terms refer to directions relative to a nonspecific plane of reference. This non-specific plane of reference may be vertical, horizontal, or other angular orientation.

To facilitate understanding and better appreciation for the described scope, in some instances either identical or associated reference numerals have been used (where possible) to designate identical or similar elements, respectively, that are common in the figures. One of skill in the art may appreciate that elements and features of one embodiment may be beneficially incorporated in one or more other embodiments without further recitation.

DETAILED DESCRIPTION

In the following disclosure, reference may be made to one or more embodiments. However, one of skill in the art does appreciate that the disclosure is not limited to specifically described embodiments. Rather, any combination of features and elements, whether related to different embodiments or not, is contemplated to implement and practice the one or more embodiments provided by the disclosure. Furthermore, although the one or more embodiments presented in the disclosure may achieve advantages over other possible solutions, the prior art (if existing), and combinations thereof, whether or not a particular advantage is achieved by a given embodiment is not limited by this disclosure. The aspects, features, embodiments, and advantages provided are merely illustrative. These are not considered elements or limitations of the appended claims except where explicitly recited in one or more of the Claims. Likewise, one of skill in the art should not construe a reference to "the disclosure" as a generalization of any disclosed subject matter.

Although there are many recognized problems with planning for the end-of-life or re-purposing aspects of a currently operational or inoperable wellbore, there are two that stand out distinctly from among the variety of issues: one is the technical aspect of what to do with a currently operational wellbore at the end of its current useful life and the other is how to financially plan for such an occasion. Given that many operators have liabilities for tens to hundreds to thousands of wells that are fluidly accessing underground formations, especially hydrocarbon-bearing formations, these issues are paramount.

In regards to the technical aspects of what to do with a particular wellbore, one may easily see the issue when describing two wellbores working the same formation a short distance apart: a first wellbore and a second wellbore. One may reasonably assume that since both wellbores are accessing the same formation that the same solution may be utilized to plug and abandon (P+A) both wellbores, but a person of ordinary skill in the P+A field would immediately recognize that assumption would be based upon too little facts. What if each well was constructed years if not decades apart? Or at the same time but by different operators? Each well may have different construction materials, different structures, or both. If they are both production wells, both wells would very likely have different production histories, which may mean that one well has undergone much more production-related activities (and possibly intervention) than the other well, which may indicate material stresses such as micro fissures in cement, joint expansion, and metal fatigue. What if one well is actually an injection well for secondary or tertiary recovery and the other is a production well that has been retrofitted from its original primary recovery use to tolerate bi-/tri-phase flow or chemical exposure, such as from excess water, surfactant flood, or critical carbon dioxide, from the formation being treated? There would certainly be significant technical differences between the two wells, especially the modified production well. A person of ordinary skill in the P+A field would also recognize that there is no P+A solution that works for all wellbores, although there are some solutions that work for many types of wellbores under a wide variety of conditions, and that there are "variations on a theme" for such solutions. What if these wells were recently acquired from another company? There may be very limited information on each well's production, completion, and intervention history, let alone other useful information such as cement logs, sensor data, and any adverse history regarding pressure or temperature, especially upon production start-up or shut—in. Given a combination of both digital and non-digital records, even if such data existed, a professional may not be able to easily find a "similar" or "like" scenario in client records that one may use to rely upon and that might act as a guide for how to proceed, let alone provide more than one reliable or potential P+A option that might be expected to have a high probability of success.

In regards to the financial aspects of managing a single wellbore and envisioning the choices that are possible for its end-of-life activities, one may envision the financial issues of a corporation overseeing multiple—hundreds—of producing and non-producing wellbores in all stages of production or support—from well planning to shutting in due to water or gas breakthrough. Attempting to determine with some accuracy the short, medium, and long-term potential liability of currently-producing assets at their end-of-life may nearly be impossible. Given that banks and other lending institutions, investors, and local, state, and federal regulators require estimates regarding liabilities, producing a GAAP (generally accepted accounting principles)-quality level of estimates for these assets turned liabilities may be equally improbable.

The present disclosure relates to a system, apparatus, and method that gathers both client and non-client data associated with wells that have and have not had P+A activities undertaken and potentially other external data, derives one or more computer-generated models by characterizing client weighting factors associated with client parameters based upon the combination of both client and non-client data associated with wells that have and have not had P+A activities undertaken, and using the one or more computer-generated models to determine one or more potential solutions to P+A activities for a client well that has not had P+A activities undertaken, including, but not limited to, one or more recommendations for performing P+A activities having a probability of success, a cost estimate for performing the P+A activities, and identification of any unique risk factors in performing a P+A activity on the client well.

The system, apparatus, and method provide a solution to the previously described problems through the use of an artificial intelligence (AI) system that that is trained through particularly advantageous machine learning (ML) processes to make automated determinations based upon prior P+A activities and associated electronic data. The AI system is configured to draw not only from client resources but also shared non-client resources, in a privacy-preserving manner, to gather as much data on transitional activities as feasible, and then process such information through its ML training component to form client weighting factors, which are based upon client parameters that are correlated with the data from the client and non-client well data that have had transitional activities. As described in more detail below, one or more machine learning models may be trained using supervised learning techniques based on known associations between particular types of data (e.g., known to be relevant to P+A outcomes or other transitional outcomes through automated and/or expert-guided analysis) and particular historical P+A outcomes and/or other transitional outcomes. In some cases, data from a variety of different sources and in a variety of different formats is automatically pre-processed and/or normalized for ingestion into a machine learning model. The AI system, once trained, is then able to process client well data associated with wells that have not undergone transitional activities and present not only potential solution(s) for conducting transitional activities, but also reliable cost estimates and risk estimates based upon prior transitional activities. Even if the client has not performed such activities in the past on its own wells, the AI system is able to provide options based on data from the outside sources if such actions were taken on different client wells, non-client wells, and/or through historical or public records, and/or through synthetic projections, with wells having similar attributes. Not only should these projections provide one or more reliable options to a planner attempting to develop reliable, safe, and economical end-of-life options for a working or inoperable wellbore, but also for a company attempting to report fairly to both owners and the government the expected cost of doing so in the future with a reasonable level of certainly. Of course, one of ordinary skill in the art will immediately recognize other benefits to such embodiment systems, apparatuses, and methods, and such variants and solutions are envisioned.

It is noted that, as used herein, transitional activities may refer to P+A, re-use, repurposing, and/or other types of activities by which a wellbore is transitioned to a different use, purpose, or state. While certain embodiments are described with respect to P+A specifically, it is noted that techniques described herein may be used with respect to any type of transitional activities for wellbores.

For example, techniques described herein improve the technical field of automated end-of-life assessments for wells by producing accurate predictions of factors related to transitional activity determinations based on data from a variety of sources and in a variety of formats through particular machine learning processes that focus on data points determined to be most significant to such predictions. Thus, by leveraging multiple sources of data in a dynamic machine learning process that is able to identify latent relationships across multiple different types of data, embodiments described herein allow factors such as costs, risks, environmental factors, and potential re-use cases to be predicted with a level of accuracy that was not possible with conventional techniques (e.g., that are based on rules and/or particular pre-configured data points). Furthermore, by utilizing privacy-preserving techniques such as federated learning, processing at secure central servers, encryption, and/or the like, techniques described herein provide data security while allowing data from a variety of sources and entities to be used for improved automated predictions. Additionally, by pre-processing, normalizing, and/or otherwise converting data from a variety of formats into one or more common taxonomies for ingestion into a machine learning model, embodiments of the present disclosure allow electronic data sources that would otherwise be incompatible with one another to be used in a common automated process for improved predictions related to end-of-life or other transitional determinations for wells. In some embodiments, one or more machine learning models used for such predictions are incrementally fine-tuned utilizing reinforcement learning from human feedback on the candidate transitional activity model outputs, thereby providing an AI system that is continuously improving to suit the needs of the end-user in an interactive feedback loop. Other training, re-training, and/or fine tuning techniques are also possible in order to provide an AI system that continuously improves based on user feedback.

Embodiments of the present disclosure further improve upon the technical field of automated end-of-life assessments for wells by providing a dynamically configurable query mechanism through which parameters used in automatically predicting transitional activity related factors may be customized for a particular user, thereby allowing for more fine-grained control over such automated processes and producing more targeted results. By targeting predictions dynamically based on particular configurable parameters, techniques described herein avoid providing users with transitional activity related predictions that are unlikely to be useful, thereby improving the effectiveness and personalization of the outputs. and avoiding utilization of computing resources that would otherwise occur in connection with producing predictions that are unlikely to be useful.

Determinations made using techniques described herein may be used for a variety of useful purposes. Examples of such purposes include transitional activity cost estimates, transitional activity engineering drawings, well risk prob-abilities, risk mitigation execution, forward equipment and personnel planning, regulatory compliance tracking, merger and acquisition (M+A) liability due diligence, financial statement accuracy, standardized, risk-based, and non-biased transitional activity techniques versus prescriptive transitional activity techniques, auditable processes for making transitional activity determinations, and/or the like.

FIG. 1 depicts a schematic diagram 100 of an artificial intelligence (AI) system regarding transitional activities, such as AI system 150, that may be useful in performing ranking and estimation operations based upon a client query. The data utilized may come from a variety of disparate sources, including information based upon the activities of the client, other client(s), and/or non-client(s) for the purposes of evaluating options for transitional activities.

Although the AI system in this instance may be shown and described as a unitary item, in one or more embodiments the AI system may reside and operate from a single integrated circuit configured to perform functions, including one or more embodiment processes and methods to be described, a processor coupled to one or more memories, a standalone computing system, a group of computing systems coupled together utilizing wired or wireless connectivity, a distributed computing system, and a combination thereof.

AI system 150 is configured to obtain data from one or more sources of information. AI system 150 of FIG. 1 is shown obtaining data from client data for all wells 120. The client data for all wells 120 includes a subset of data for all client wells that have had transitional activities undertaken, as will be better appreciated in light of FIG. 2 and its associated description. The AI system 150 is also shown accessing data from non-client sources 140. Such non-client sources of data may include, but are not limited to, historical information, public information, synthetic information, and accessible, genericized non-client data for all wells that have had transitional activities undertaken, along with those that have not had transitional activities undertaken. Such information and how the AI system obtains and processes such information as part of its determination functions will be better appreciated in light of FIGS. 2 and 3 and their associated description.

AI system 150 is also configured to accept a user P+A query 101. For example, user P+A query 101 may be generated by a user through selections of parameters via a user interface and/or through natural language input. In one particular example, a user interface provides a user with parameters to select, such as well types, well attributes, geographic regions, and/or the like. In another example, a user provides a natural language query (e.g., via text input or voice input), and the natural language query is processed, such as using natural language processing (NLP) techniques, to extract parameters such as well type(s), well attribute(s), geographic region(s), and/or the like. P+A query 101 generally represents a query for data related to a P+A determination according to particular parameters, such as well type(s), well attribute(s), geographic region(s), and/or the like. It is noted that P+A is included as an example of a type of transitional activity, and the query may alternatively relate to another type of transitional activity. Thus, description herein related to a "P+A query" and P+A activities may alternatively refer to other types of transitional activities without departing from the scope of the present disclosure.

In one or more embodiments, one or more client parameters may be modified as part of conveying a user P+A query to the AI system. For example, a client may turn "off" a client parameter such that the client parameter is not utilized during the determination. In one or more embodiments, one or more client weighting factors may be modified as part of conveying a user P+A query to the AI system. Modifying or inactivating one or more client parameters or client weighting factors may affect the grouping of wells determined by the client ML model, such as client ML model 154, in an initial solution group, such as initial solution group 160, as will be described further.

Upon receiving a user P+A query, in one or more embodiments the AI system 150 is configured to initiate one or more queries to determine if information resources need to be updated before processing data to derive an initial solution group 160. For example, the AI system 150 may determine the last period in which client weighting factors 156 were either automatically updated by ML training component 152, through user interaction, such as through user solution query 162 or user driver query 166, or a combination thereof. If the last period is beyond a tolerance pre-set limit or if the user has provided direction through the user P+A query to refresh the client weighting factors 156, then the AI system 150 directs its ML training component 152 to perform an update of the client weighting factors 156. A process for how client weighting factors are updated will be better appreciated in light of FIG. 2 and its associated description. If a manual modification is provided, the client weighting factor is modified to the new value. In one or more embodiments, if the AI system after updating the client weighting factors determines that the manually-set client weighting factor is significantly different than the determined client weighting factor, in one or more embodiments the AI system may report the difference and request confirmation of the manual value. The AI system may also direct, receive, and process updated data for the client data for all wells 120 and the data from non-client sources 140 before executing a user P+A query.

Upon confirming that the data for client data for all wells, the data from non-client sources, and the client weighting factors, are all up-to-date and ready for use, the client ML model may utilize the client data for all wells that have and have not undergone P+A activities and the client weighting factors to determine an initial solution group based upon the user P+A query. The client ML model utilizes predictive and prescriptive optimization on the normalized data utilizing combinations of machine learning and statistical algorithm ensembles on a set of data representing all client wells that have and have not had P+A activities undertaken with the client weighting factors. The client ML model may analyze, collate, and correlate each determined client well not having had P+A activities undertaken that satisfies the user P+A query with one or more wells that are in the data set of all client and genericized non-client wells that have had P+A activities undertaken to derive an initial solution group of similar wells having had P+A activities undertaken to determine a best-fit for P+A activities for the client well not having had P+A activities undertaken based upon the user P+A query.

Figure 2:
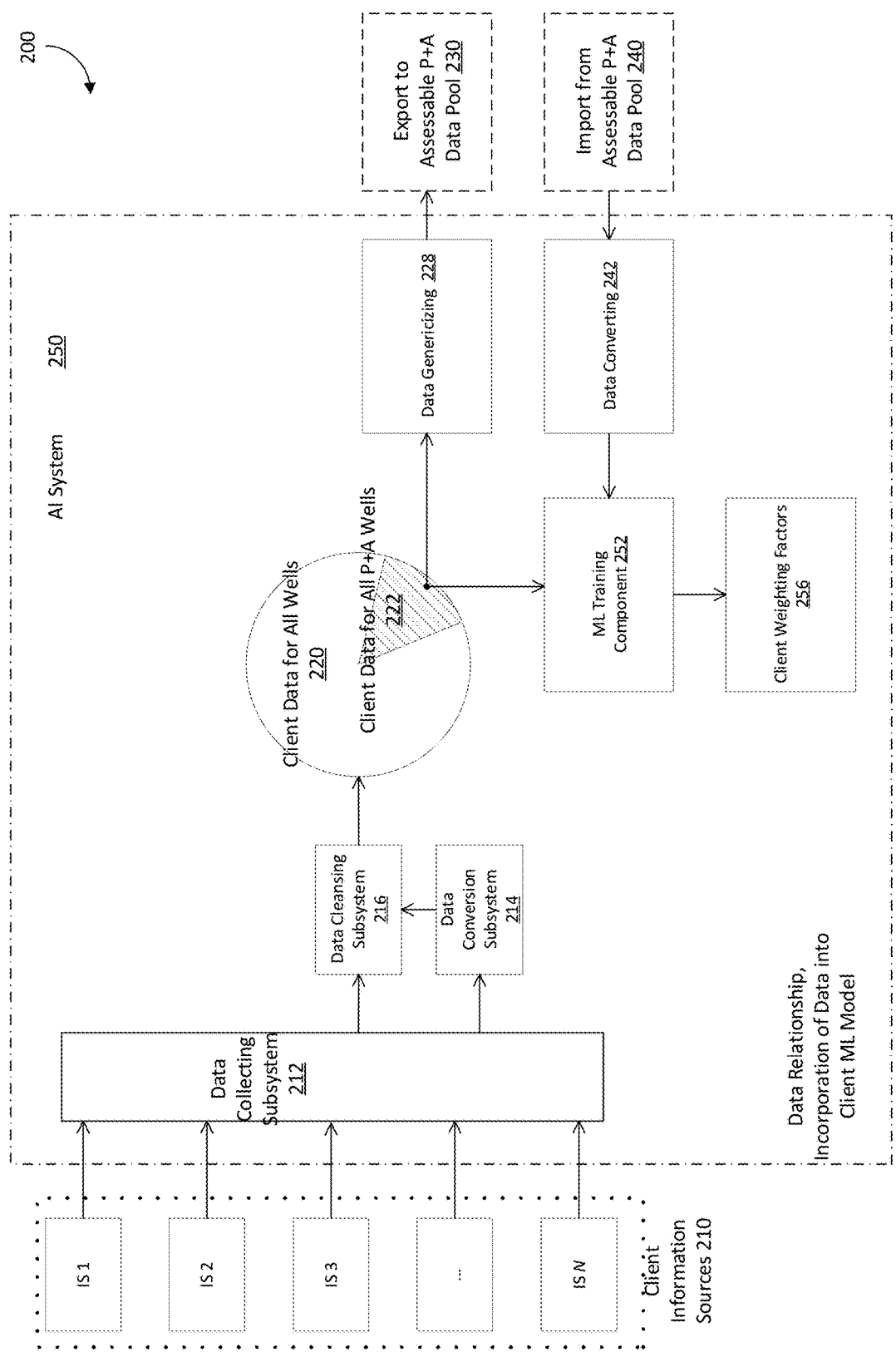
FIG. 2 depicts a schematic diagram for data collecting and processing by an AI system regarding transitional activities for a wellbore, according to one or more embodiments.

The entire set of all client wells, such as the set of client wells 220 of FIG. 2, may, in some embodiments, not be analyzed as a set. The client weighting factors are derived from the combination of the data for all client wells that have had P+A activities undertaken and the data for all accessible, genericized non-client wells that have had P+A activities undertaken, and the client weighting factors are utilized by the ML model to determine the correlation relationship with the client parameters upon which they are based. The exclusion of the wells that have had P+A activities undertaken from this determination saves processing time, power draw by the AI system, and avoids redundancy of determination by avoiding processing information that is unnecessary to reanalyze.

When a well has had P+A activities undertaken, more robust and "true" data may potentially be available, and such data can be used in training with accurate cost data, as well as actual activities as derived from ground truth data (e.g., including data from tour sheet inputs). Wells (client or non-client, but where data exists and can be ingested) where P+A (or conversion) is completed provide a distinct set of attributes and values. These can be compared to wells that have the same characterization where P+A (or conversion) is not yet done and may not even be necessary, but the expected activities (and thus time/costs) would be highly similar. Any well where the work has been completed can be used for training models and as a benchmark for comparison to any well where the work is not yet done but may be done.

The client ML model may utilize at least one of the following techniques: linear regression, support vector regression, classification, regression trees, random forests, and neural networks. The client ML model may utilize at least one of the following classification techniques: logistic regression, support vector machine and support vector regression, nearest neighbors, decision trees, random forest, and neural or deep learning networks. The client ML model may utilize at least one of the following clustering methods: k-means, k-medoids, expectation-maximization, agglomerative clustering, and nonparametric Bayesian models. The client ML model may utilize at least one of the following feature selection and feature engineering processes: information gain, chi-square, principal component analysis, and filter and wrapper feature selection methods. The client ML model may utilize at least one of the following ensemble methods and models: bagging, boosting, gradient boosting machine, and random forests. The client ML model may utilize at least one of the following time series analyses: multivariate time series analysis, hidden Markov models, and nonparametric Bayesian models. The client ML model may utilize at least one of the following large-scale or big data analyses: autoregressive integrated moving average (ARIMA), multivariate time series analysis, hidden Markov models, nonparametric Bayesian models, autoregressive conditional heteroskedasticity (ARCH), exponentially weighted moving average, and generalized autoregressive conditional heteroskedasticity (GARCH). The client ML model may utilize at least one of the following large-scale or big data analyses: Hadoop MapReduce, Spark, approximation, and locality sensitivity hashing.

In some embodiments, feature selection for determining which features to use as inputs to a given machine learning model involves determining which input features are most highly correlated with a target output variable, and this process may be automated and/or expert-guided. For example, automated feature selection techniques may involve providing a given model with different subsets of input features (e.g., during training or testing) and determining which subsets produce the most accurate results for that target output variable. Automated feature selection techniques may additionally involve providing a given model with a complete set of input features and allowing gradient descent to determine feature weighting on the target output variable. Expert-guided feature selection processes may involve industry experts providing input indicating which input features are most likely to be helpful in predicting particular target output variables.

In one or more embodiments, the initial solution group may provide a listing of client wells not having had P+A activities undertaken that satisfies the user P+A query. In one or more instances, the initial solution group may also list the client parameters that are most associated with the terms of the client query. In one or more embodiments, the listing of client wells may be ranked in order by a score derived from the client parameters. Each client parameter has a client weighting factor, and a value determined by the client weighting factor and the value for each well for a client parameter may be determined by the ML model. In one or more embodiments, a list of client parameters and the value for each client weighting factor is available for review and is provided in the initial solution group. In one or more embodiments, the data for each client well having had and not having had transitional activities undertaken is available for review by the user.

Upon analysis of the initial solution group 160 provided by the AI system 150, a modification or alteration of the initial solution group may occur utilizing user solution query 162. In some instances, sorting the listing using one or more client parameters to view the listing of client wells in a different manner, but not otherwise altering the results provided by the AI system, may occur. In other instances, a local query on the listing that excludes certain client wells based upon an exclusion criterion, such as by utilizing one or more client parameters, may occur. This post-solution exclusion would create an abbreviated listing of client wells not having had P+A activities undertaken but otherwise would not alter the remaining results provided by the AI system.

In one or more instances, upon analyzing the initial solution group, one or more client weighting factors or client parameters may be modified, and the process re-executed. For example, a "+" value for a client weighting factor may be modified to be "0" to deemphasize the particular client weighting factor, or a natural language input might be utilized to adjust client weighting factors. As well, a client parameter associated with wells that have completions equipment still in the wellbore after P+A activities may be turned to an "off" position. In either instance, the AI system after the modification executes a revised run based upon the revised or modified value(s) and provides a revised initial solution group similar to the previous one but utilizing the revised client weighting factor(s) or client parameter(s). In one or more instances, the modification to the client weighting factor or client parameter may be "temporary", that is the user may indicate to the AI system that the change is only for the next process run with the revised value or setting to the client weighting factor or client parameter. In one or more instances, the modification to the client weighting factor or client parameter may be "semi-permanent", that is the revised value or setting may be maintained by the AI system in the weighting factors data stored in storage, such as weighting factors data 1157 of FIG. 7, until the next ML training component update. One of ordinary skill in the art appreciates that an initial solution group report or any other generated response to user solution query may be customized to be client-specific.

Upon acknowledgment of a satisfactory initial solution group, AI system 150 correlates and combines the listing of client wells not having had P+A activities undertaken with several determinations made using data from a plurality of client wells that have had P+A activities undertaken, accessible, genericized non-client data for a plurality of wells that have had P+A activities undertaken, historical information, public information, and/or synthetic information, to create a finalized solution group, such as finalized solution group 164 as provided in FIG. 1.

Figure 4:
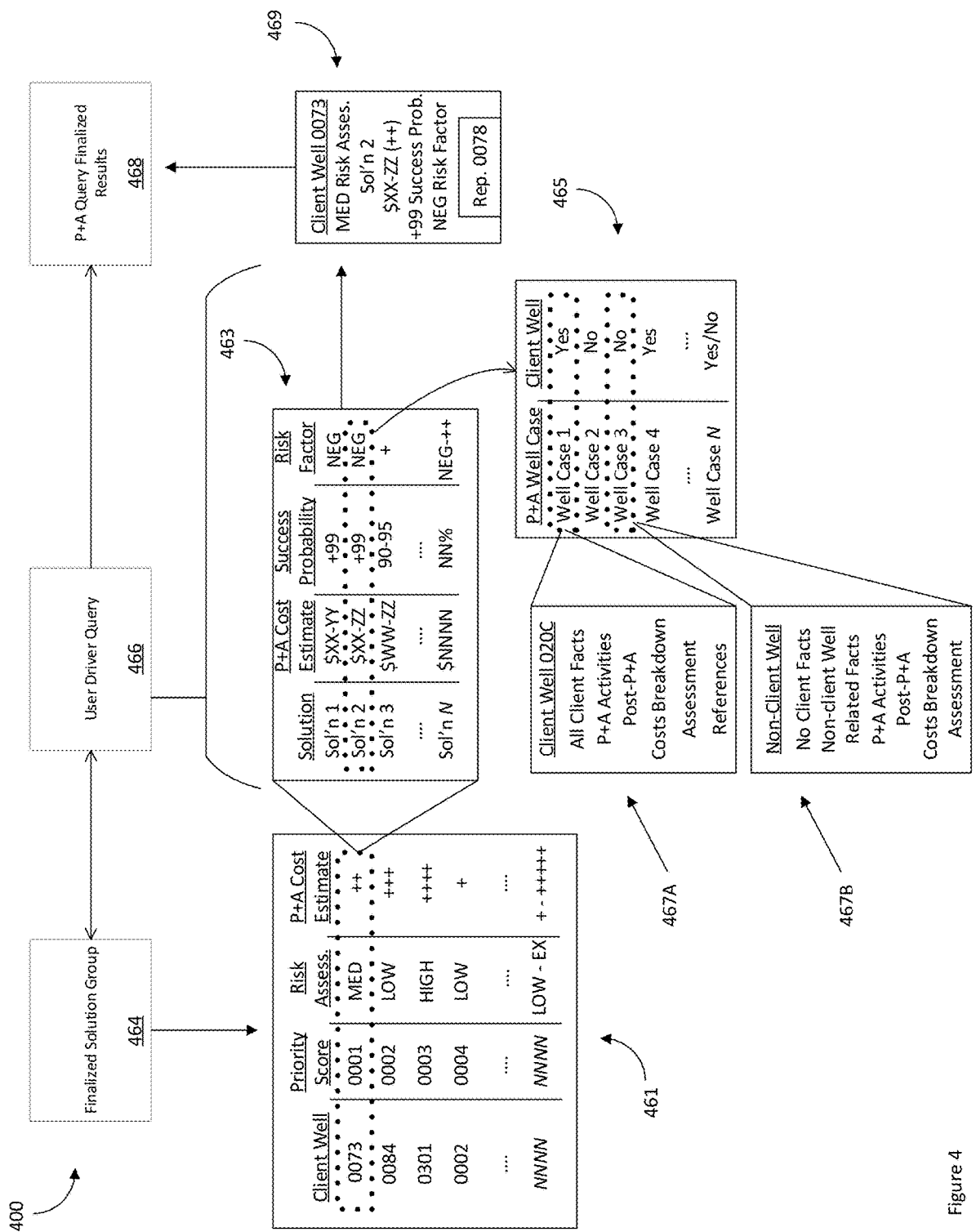
FIG. 4 depicts a schematic diagram of one or more reports associated with a determination by an AI system regarding transitional activities for a wellbore, according to one or more embodiments.

An example of a finalized solution group is presented in FIG. 4 as finalized solution group 464. FIG. 4 depicts a schematic diagram 400 of one or more reports associated with a determination by an AI system regarding P+A activities for a client well. In FIG. 4, the finalized solution group 464 may be represented in a finalized solution group report 461 visually, textually, auditory, digitally, or by any manner interpretable by a human or a machine configured to receive and process such information. In the instance shown in FIG. 4, finalized solution group report 461 presents a listing of client wells that have not had P+A activities undertaken ranked by a "priority score", which may be determined by a pre-determined functionality of the AI system 150 via the ML model 154. A "risk assessment" may also be presented by a pre-determined functionality of the AI system via the ML model for each client well. A generalized "P+A Cost Estimate" grade may also be presented by a pre-determined functionality of the AI system via the ML model, which in this instance appears to be a relativistic grade compared to other client wells in the listing. In one or more instances, the listing may not represent "all" client wells that have not had P+A activities undertaken. This may be due to prior modifications to a client parameter, a client weighting factor, or the user P+A query.

In some instances, as shown in FIG. 4, selection of a particular client well on the finalized solution group report 461 may query additional information, which is provided by the AI system. In FIG. 1, by advancing to user driver query 166 from finalized solution group 164, such as by selecting an entry in finalized solution group report 461 (dotted box) of FIG. 4, the AI system 150 may present a solution set for that particular client well. The solution set was previously determined by the ML model of the AI system for each client well not having undergone P+A activities, and now the AI system reports a solution set for the particular client well selected. For example, selection of "client well 0073" as part of user driver query 466 queries the AI system to present the determined solution options associated with "client well 0073", such as in a listing or report, such as solution options report 463. Solutions options report 463 of FIG. 4 is shown providing one or more known and recommended P+A activity solutions. In some instances, one or more of the recommended P+A activity solutions may be based upon "best practices" or synthetic data and not based upon actual client or non-client P+A activities. As shown in FIG. 4, solutions options report 463 also provides a cost estimate for each solution—in this case a range, an estimate of successful implementation based upon prior similar P+A activities, and an assessment of any elevated "risk factor" given data about the client well and the proposed P+A activity as cross-correlated with one another, all of which was determined by the ML model of the AI system. One of ordinary skill in the art appreciates that solution options report or any other generated response to user driver query may be customized to be client-specific.

Activity reports and comments from individuals involved in P+A activities are reliable sources for developing insights. The "risk" element is distilled from past known events and the circumstances surrounding them. If "A" and "B" and "C" in the well's history have resulted in outcome "D" which is an unscheduled and undesirable event, then other instances where A, B, and C exist can lead to D, also. There are objective and subjective risks. The objective risk of a sour well is relatively obvious and there are policies and guidelines in existence to address that risk. Subjective risks may also be identified, and, in a large sample, instances of lost time/materials may also be identified that can be avoided or at least planned for. Comments present on tour sheets are an example of evidence of the A or B or C and the outcome D. As described herein, one or more machine learning models of an AI system may be trained to analyze all unstructured sources such as these (e.g., activity reports and comments in tour sheets) in order to extract information for use in training and/or using one or more machine learning models to predict values related to P+A activities (e.g., risks).

The user driven query may provide access to additional information for inspection, review, and analysis. For example, for a selection of "Solution 2" from the solution options report 463 may query from the AI system a listing of ML model-determined associated P+A well "cases" that best-fit the selected well and the selected solution. P+A well case report 465 is a listing of both client and accessible, genericized non-client wells from the set of all wells that have had P+A activities undertaken. The P+A well case report focuses especially on any cases related to "Solution 2" or a variation thereof to be most similar to "client well 0073" in accordance with the client weighting factors.

By querying one of the entries associated with client-related well data, such as "Well Case 1" given on P+A well case report 465, the AI system may present in one or more instances a window with additional information summarizing the particular well, its P+A activities, and its non-P+A data. In this particular instance, "Well Case 1" represents a client well (indicates "Client Well" as "yes"; "Client Well 020C"), so the AI system is able to present a significant amount of data regarding the client well in window 467A. The AI system appears to present in this instance all of the data present in the client data for all client wells 120. In the case of accessing "Well Case 3", which is indicated on the P+A well case report 465 as not being a client well ("Client Well is "no"), the AI system is able to present some amount of data regarding the non-client well in window 467B. In this particular instance, "Well Case 3" represents a non-client well, so the AI system may only access information about the non-client well and present what information is there that is provided in data from non-client sources 140. "Well Case 3" still has a significant amount of important technical and financial information—well structure, cost breakdown, P+A activities—that is additive to the solution presented and should provide confidence in the overall recommendation by the AI system.

Upon determining a well to perform P+A activities and a solution for doing so, finalization of the P+A query results 168 may occur as shown in FIG. 1. As shown in FIG. 4, P+A query results may take the form of a P+A proposal report 469 summarizing the determined estimated cost and risk projection of the P+A activities for the selected solution on the selected client well. In one or more instances, the selection of the particular solution may be conveyed to AI system 150 for updating user preferences and initiating future queries for information on the client well and anticipated or completed P+A activities.

Figure 3:
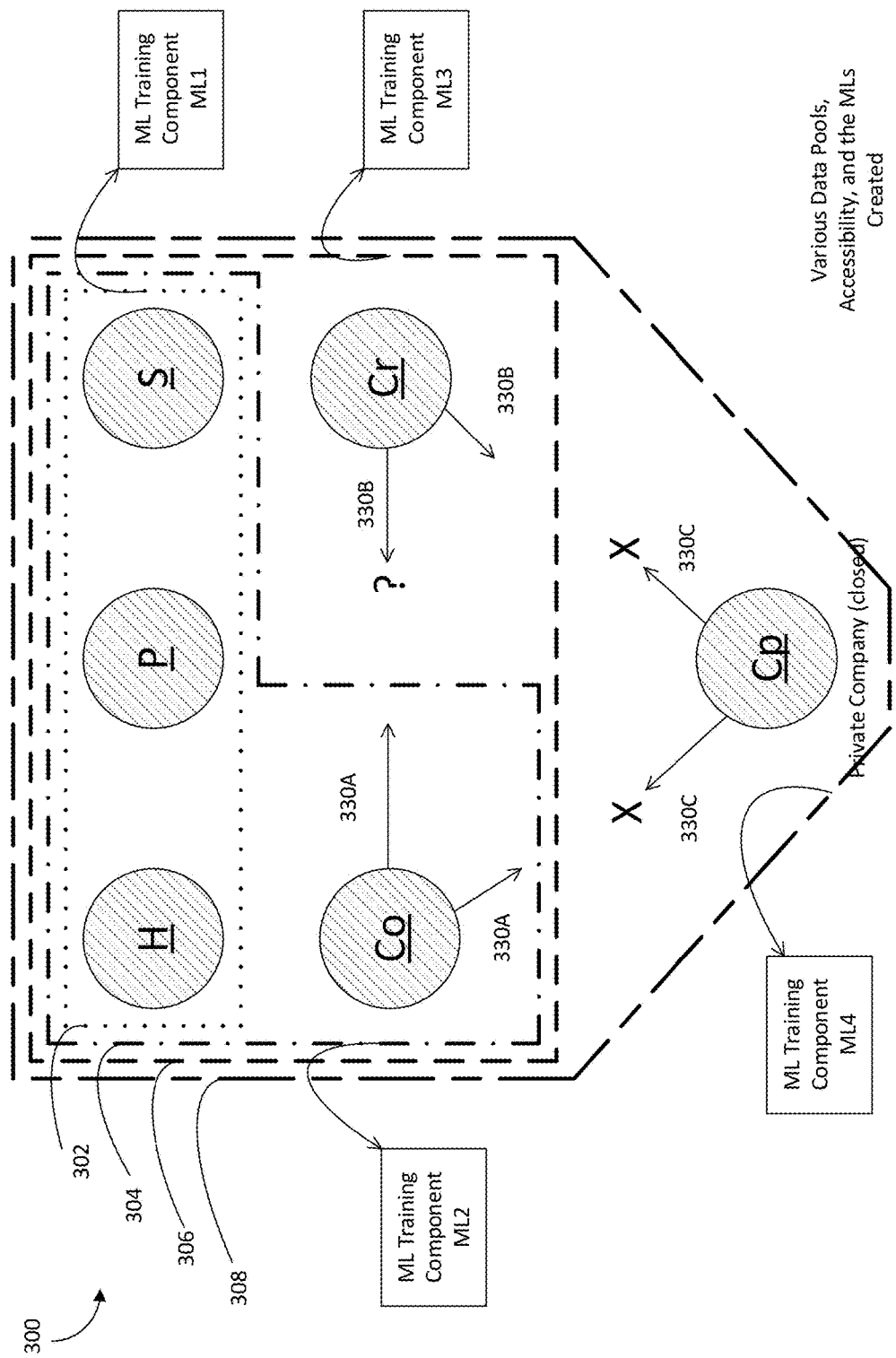
FIG. 3 provides a schematic diagram of several data pools potentially accessible to an AI system regarding transitional activities for a wellbore, according to one or more embodiments.

An artificial intelligence (AI) system comprising a machine learning model in one or more embodiments may further comprise a machine learning (ML) training component to provide training for the ML model. FIG. 2 depicts a schematic diagram 200 for the data collecting and processing by the AI system regarding P+A activities 250, which in some instances may be similar or the same as AI system 150 of FIG. 1. This data collection and processing is to prepare the ML training component 252, which in some instances may be similar or the same as ML training component 152 of FIG. 1, to train the ML model 254, which in some instances may be similar or the same as ML model 154 of FIG. 1. FIG. 2 has an association with FIG. 3 in relation to both providing and receiving accessible, genericized P+A well data from external data pool sources. FIG. 3 will be described below.

In providing information and data to the ML training component for its training algorithms and processes, portions of data associated with completed P+A well activities are desired. In one or more embodiments, the AI system obtains P+A well information from one or more client internal resources. As provided in FIG. 2, one or more client internal sources of information, such as internal source (IS) of data 1, 2, 3 . . . N, which collectively (dotted box) are client internal information sources 210, are accessible and interpretable. The AI system 250 utilizes data connectivity with the client internal information sources 210 and gathers data associated with P+A well activity into a data collection subsystem 212 for further processing.

The client well data acquired by the AI system from the client internal information sources may be related to one or more sets of technical and historical information that will ultimately be associated with determining one or more courses of P+A action(s) to take for a given client well. For example, the data obtained from client internal information sources may include, but is not limited to, information associated with geology and geophysical data, such as 2D (2-dimensional), 3D, & 4D seismic data and interpretations, such as the location and form of faults, anticlines, synclines, fractures, stratigraphic features, integrated well logs and areal maps; rock property data, including landing zone targets, target interval, target height, thickness of sequences, landing sequence type, gas shows, core analyses, and mudlogs; well log and measurement-while-drilling (MWD) log analysis, such as structures, thickness, formation identification, normalized curve data, gamma ray, effective porosity, density, resistivity, TOC (total organic carbon), water saturation, and gas-in-place data; and synthetic current and historical data from reservoir modeling, including inputs and outputs. In this context, "synthetic" data means data that is not obtained from real sources. Although synthetic data may represent determinations based upon data originating from a real source(s), the determinations, such as projections of results in future periods, themselves are not reflective of real-world activity.

Additionally, the data acquired by the AI system from the client internal information sources may include, but is not limited to, information associated with drilling data, such as information from surveys, such as MD (measured depth), inclination, azimuth, TVD (true vertical depth), VS (vertical steering), departure north/south/east/west, DLS (dog leg severity), build, and turn; parameters, such as WOB (weight on bit), ROP (rate of penetration), torque, circulation rate, gamma ray, differential PSI (pounds per square inch), pounds per other unit (e.g., metric units may also or alternatively be used), choke position, hook load, flow, alarm states, pump rates, pump stokes, build rate, block height, tank volumes, over pull, northing, easting, inclination, azimuth, rotary torque, trip speed, tank fill, walk rate, resistivity, rotary RPM (rotations per minute), mud viscosity, mud weight, 3rd party gas, deviation from plan, and formation density; and wellbore schematics, such as conductor casing depth, water depth, minimum casing depth, surface casing depth, production casing depth, float subs, float collars, float shoes, marker joints, cement design, displacement volume, additives type, and additives volume data.

Additionally, the data acquired by the AI system from the client internal information sources may include, but is not limited to, information associated with completions data, such as structured digital data, such as fracture treatment, number of stages, landing zone for each fracture stage, fracture gradient, breakdown pressure, breakdown rate, min/max treating rates, min/max treating PSI, and ISIP (instantaneous shut—in pressure); stage phases, such as start/end date and time, fluid type, proppant density, slurry volume, cumulative slurry volume, clean volume, cumulative clean volume, proppant volume, start/end rates, start/end pressures, additive type, additive name, and additive volume, and perforations, such as stage number, top perforation, bottom perforation, TVD (true vertical depth) of perforation, shot density SPF (shots per foot), shots planned, actual number of shots, cluster size, perforation diameter, phasing, charge size, penetration depth, gun size, charge type data. Unstructured textual data associated with completions data may include, but is not limited to, mechanical tool information, well completion logs and schematics, lists of tool configurations put into wells for completion and production, sales orders with part numbers, technical limits of the tool string, and job logs, such as, but not limited to, operator, data/time, activity, remarks, job number, sold to, billed to, plant, Purchase Order/Authorization (PO/PA) for Expenditure (POE/PAE) number, shipped to, description, address, details, and well Identifier. One of ordinary skill in the art will recognize that similar attributes and their values would come into existence for any intervention, repair or re-purposing operations that resulted in a change to the mechanical condition of the wellbore or the selection of one or more alternate subterranean features.

Additionally, the data acquired by the AI system from the client internal information sources may include, but is not limited to, information associated with production data, such as gas analysis, such as BTU (British thermal units) calculation, depletion (Z) factor, sample pressure, sample temperature, molar component percent, and GPM (gallons per minute) measure; production estimates, such as daily gas, daily condensate, daily water, daily casing pressure, daily tub pressure, daily pad volume, condensate haul tickets, water haul tickets, tank gauges-top, and tank gauges-bottom; and SCADA (supervisory control and data acquisition), such as gas rate, differential pressure, tubing pressure, casing pressure, ESD (emergency shutdown) alarms, separator pressures, choke position, LEL (lower explosive limit) readings, condensate density, water density, tank gauges-top, tank gauges-bottom, EBU (Eddy break-up) data, flash separation data, VRU (vapor recovery unit) data, and battery voltage data.

Additionally, the data acquired by the AI system from the client internal information sources may include, but is not limited to, original license information for a well, well location, well characterization (e.g., onshore or offshore, subsea or dry tree, producer, injector, storage, geothermal, enhanced oil recovery, or other, oil, gas, steam, miscible flood, sour/sweet, and/or the like), well depth, well directional information, casing sized and setting points, casing dimensional and mechanical properties, cement characteristics, temperature profile, geology (e.g., formation depths and properties), completion equipment, tubing dimensional and mechanical properties, suspension equipment, history of operations and activities, and/or the like.

Additionally, the data acquired by the AI system from the client internal information sources may include, but is not limited to, P+A cost data such as actual execution time breakdown, time and quantities of services/goods, cement cost, rig cost, P+A technique, troubles/issues, and/or the like.

Additionally, the data acquired by the AI system from the client internal information sources may include, but is not limited to, regulatory data such as regulatory requirements by jurisdiction, isolation requirements, time sensitivity requirements, and/or the like, environmental sensitivity information such as surface water locations or aquifer depth, sensitive environmental areas, population proximity, and/or the like, and/or global location information such as location data associated with a global positioning system (GPS).

Additionally, the data acquired by the AI system from the client internal information sources may include, but is not limited to, completed P+A well data such as reports (e.g., daily or otherwise recurrent reports) from completed P+A projects, well information associated with such completed P+A projects, and/or the like, and/or identified well integrity issues, such as vent flow, lost circulation, stuck pipe, poor cement bond, and/or the like.

The AI system, having gathered data from client internal information sources into data collecting subsystem 212, processes the collected data for various uses, including well selection, solution determination, and training purposes. Data that is already digitized may pass into data cleansing system 216. Within data cleansing system 216, pre-determined routines and functions may convert none, some, or all of the digitized data from a first format into a second format, where the second format is suitable for use and interpretation by the AI system. Data that is already formatted for use by the AI system may be screened and then traverse through the data cleansing system unmodified.

The data cleansing system may also have a process or a routine to look for certain types of data content (or lack thereof). Upon detecting a data anomaly or omission, the routine may prevent the data associated with the anomaly or omission from proceeding further and exclude the associated data. In one or more instances, the excluded data may be flagged for other automatic or manual processes to analyze and determine if the data should be retained, repaired, supplemented through an automated or manual means, or eliminated entirely. In one or more instances, if a certain property is not present, regardless of the content of the remainder of the associated data set, the associated data set may be expunged without warning or notice.

The AI system in FIG. 2 also shows a second pre-processing system for none, some or all of the client internal information sources, such as for unstructured textual data and structured data that may need additional conversion. Data conversion system 214 may take, for example, structured textual data that is in a first form and convert the data en masse to a second form using a pre-determined equation or function. The data conversion system may also analyze a set of data and convert or correlate the analyzed set of data to an empirical value that is utilized by the AI system, such as for a client parameter. The data conversion system may in one or more instances utilize aspects of machine learning to analyze unstructured textual data, recognize text associated with a certain data attribute, and generate an associated digital data entry representing the data attribute. Upon completion of the conversion in data conversion subsystem 214, the converted data is conveyed to data cleansing system 216.

In one or more instances, the data conversion system 214 may also have a process or a routine to add an indication to converted data that may indicate that additional review is required before utilizing the marked data.

In some embodiments, the data conversion system 214 converts one or more non-numerical data points into numerical data. For example, textual or other non-numerical data may be converted into one or more embeddings, such as using an embedding model (e.g., a large language embedding model). An embedding generally refers to a vector representation of an entity (e.g., text string or other attribute) that represents the entity as a vector in n-dimensional space such that similar entities are represented by vectors that are close to one another in the n-dimensional space. In one example, embeddings are generated using a Bidirectional Encoder Representations from Transformer (BERT) model, which involves the use of masked language modeling to determine embeddings. In other embodiments, an embedding model may involve embedding techniques such as Word2Vec and GloVe embeddings. These are included as examples, and other techniques for generating embeddings are possible. Furthermore, in some cases, textual or other non-numerical data may be converted into one-hot encoded vectors. A one-hot encoded vector generally refers to a vector that has a number of binary values that is equal to a number of possible classifications or categories, with each value in the vector corresponding to a particular classification or category, and the ith value of the vector may be set to one if the vector represents the classification or category corresponding to value i, while all other values in that vector will be set to 0.

In some embodiments, the data conversion system 214 and/or data cleansing system 216 involve input from one or more technical experts and/or machine learning models, such as to guide the process of preparing data for ingestion into ML client model 252.

After the data normalization functions of data conversion and data cleansing, the AI system aggregates the normalized client information into a client data set of all client well information. The set of all client well data is represented in FIG. 2 as circle 220. The set of all client well data 220 contains all the data requested by the AI system 250 but is now formatted for use by the ML client model 252 and the ML training component 252. For example, the set of all client well data 220 may be formatted into a common taxonomy so that data points that were previously in different (e.g., incompatible) formats may now be processed by ML client model 252 together in order to identify latent relationships among such data points. In some embodiments, normalization involves unit standardization and language standardization. Within the client data for all wells is a subset represented by pie wedge 222 that contains client data for all wells that have had P+A activities undertaken. The client data for all wells that have had P+A activities undertaken 222 has the form and information that the ML training component 252 uses to train the client ML model 254 and provide client weighing factors 256.

The client data for all wells that have had P+A activities undertaken may contain data regarding wells that have a wide breadth of structured and unstructured information within it, such as from beginning of the P+A assessment process, such as an end-of-life assessment by the client, to completed P+A activities and long-term maintenance of the abandoned well. One of ordinary skill appreciates that the circle 220 and pie 222 of FIG. 2 are merely representative in both shape and relationship; the actual data is contained in data storage structures, such as one or more databases, one or more data pools, and other forms and formats where data is temporarily, semi-permanently, and permanently retained.

In one or more embodiments, the AI system receives data from non-client sources. That is, the AI system may import information from external or outside sources from the client. The external information is utilized to create, supplement, and improve upon the ML training component. Some of the external information may also be utilized by the ML model and the AI system to normalize both client and non-client data.

Shown in FIG. 2, dashed box 240 indicates that data from an accessible external data pool is imported into the AI system 250. The accessible data pool is not from the information system of the client (210); rather, the data is obtained from one or more accessible data pools, such as the data pools 300 presented in FIG. 3, as will be described. The accessible data from accessible data pools 300 may include historical information, public information, synthetic information, and accessible, genericized non-client data for all wells that have had P+A activities undertaken.

Similar to the processes of handling the client internal information sources to convert the information into client data for all wells that have had P+A activities undertaken useful for the AI system, the historical information, public information, synthetic information, and accessible, genericized non-client data for all wells that have had P+A activities undertaken from the accessible data pools undergoes a similar data conversion and cleansing process 242 to normalize the data for use by the AI system generally and for the ML training component specifically.

After the client internal data for all wells that have had P+A activities undertaken, the accessible, genericized non-client data for all wells that have had P+A activities undertaken, the historical information, the public information, and the synthetic information have undergone conversion and cleansing processes that have normalized the various data, an ML training component, such as ML training component 252, may then process the normalized data to determine clusters of correlation in multi-dimensional space to identify a machine learned ranking of client weighting factors for each of a plurality of client parameters. Each client weighting factor is associated with a positive P+A activity result that is present within the data for all wells that have had P+A activities undertaken. For each client parameter, a positive (+), a neutral (0), or a negative (-) client weighting factor is assigned for the client parameter in relation to a positive P+A predicted result. In addition, the ML training component may perform the inverse: it may invert the client weighting factor for a client parameter resulting in a negative P+A result.

As part of the ML training process, the ML training component transforms the data, especially the client and non-client data for all wells that have had P+A activities undertaken, which may also utilize data and functions and processes that incorporate or utilize historical information, public information, and synthetic information as part of the conversion process, into client parameters. The ML training component may then determine correlated client weighting factors based upon the data for each client parameter. The categories of each client parameter may then be valued with a correlated client weighting factor based upon the root data.

One or more client parameters may be utilized to analyze and determine the impact upon a positive P+A activity result. For example, a client parameter may be associated with Geographic Factors. Geographic Factors may not only be affiliated with geography and geology of a location, but also with legal requirements, costs, such as labor and materials, and time for completion. In one or more instances, Geographic Factors may be grouped by Region, such as Asia-Pacific, Europe, Latin America, Middle East, Africa, and North America. Geographic Factors may be grouped in one or more instances by Nation, such as Libya, Indonesia, the Kingdom of Bahrain, Mexico, and Romania. Geographic Factors may be grouped in one or more instances by Sub-Unit, such as by States or Provinces, such as Pennsylvania (United States), British Columbia (Canada), and the Eastern Province (Kingdom of Saudi Arabia).

In one or more embodiments, for a client parameter associated with a Geographic Factor there may be one or more additional client parameters. In one or more embodiments, each Geographic Factor, such as a Nation, may have a Regulation Type Factor, an Onshore Cost Adjustment Factor, an Offshore Cost Adjustment Factor, and Other Factor(s). In one or more embodiments, a Regulation Type Factor may represent a listing of minimum government requirements required to have well abandonment approved as complete. In one or more embodiments, either or both an Onshore or Offshore Cost Adjustment Factors may represent a country or geographic multiplier to take pricing changes into account for performing onshore and offshore P+A activities, respectively, for a given Geographic Factor. Such cost adjustment factors may be indexed to a normalized value, such as compared to the cost of onshore or offshore P+A activities in the United States, respectively. In one or more embodiments, an Other Factor(s) to a Geographic Factor may be unique instances that occur for a given region, nation, or sub-unit that may drive costs or risk. These may include, for example, a representative regulatory or judicially based environmental penalty in a jurisdiction for non-compliance associated with P+A activities.

Another example of a useful set of client parameters that may be associated with positive P+A activity results may include Regulatory Factors. In one or more embodiments, a Regulatory Factor may include one or more Government Minimum Standards Factor, such as, but not limited to, a cementitious or other plug requirement, components and properties of the plug, minimum plugs required, minimum plug length, rock to rock required, minimum length of window opening, number of windows required, pressure testing required, minimum pressure tests, surface wellhead removal, surface casing removal, minimum depth of casing removal, surface remediation, subsurface pipeline plugging, pipeline removal, and subsurface completion equipment removal. In one or more embodiments, a Regulatory Factor may include one or more Exploration & Production (E&P) Minimum Standards Factor, that is, what the client that is the current producer from the well to be P+A or that has a well that has been previously abandoned in its care. Some, many, or all of the same factors as provided in the Government Minimum Standards Factor may apply to the E&P Minimum Standards Factor.

Another example of a useful set of client parameters that may be associated with positive P+A activity results may include Cost Factors. In one or more embodiments, a Cost Factor may include one or more Onshore Cost Factors, such as, but not limited to, service rig day rate, mobilization costs, cement plug cost per unit volume, single string milling costs, dual string milling costs, fishing service day rate, and contingency and ancillary costs. In one or more embodiments, a Cost Factors may include one or more Offshore Cost Factor, such as, but not limited to, offshore rig spread rate, offshore cementing cost per unit volume, personnel costs, disposal costs for recovered equipment, and contingency and ancillary costs. Such cost adjustment factors may be indexed to a normalized value, such as compared to the cost of onshore or offshore P+A activities, respectively, in the United States.

Another example of a useful set of client parameters that may be associated with positive P+A activity results may include Well Information Factors. In one or more embodiments, a Well Information Factors may reflect the mechanical well attributes, including equipment manufacturer's name and technical specifications. In one or more embodiments, a Well Information Factor may include, but is not limited to, well age, well depth, well located onshore, well located offshore, well offshore depth, well location in deep water, presence of an offshore platform, casing size, casing depth, casing weight, liner hanger depth, well configuration—vertical/directional/horizontal, cement type, top of cement, cement bond quality, production tubing in place, production fluid—water/oil/gas fractions, sour production, corrosive production, wellhead pressure, B annulus casing pressure, C annulus casing pressure, top of reservoir, bottom of reservoir, presence of freshwater aquifer, depth of freshwater aquifer, and presence of surface pipelines.

Another example of a useful set of client parameters that may be associated with positive P+A activity results may include Risk Factors. In one or more embodiments, a Risk Factors may reflect site, geological, national, or well-based risks to positive P+A activities. In one or more embodiments, a Risk Factor may include, but is not limited to, population proximity, fresh water proximity, wellhead pressure, critical sour, offshore location, environmental regulations, methane leakage, geographic access, and lack of physical wellhead location.

The ML training component may utilize predictive and prescriptive optimization on the normalized data utilizing combinations of machine learning and statistical algorithm ensembles to determine client weighting factors for the client parameters. The ML training component may utilize at least one of the following techniques: linear regression, support vector regression, classification, regression trees and random forests. The ML training component may utilize at one of the following classification techniques: logistic regression, support vector machine and support vector regression, nearest neighbors, decision trees and random forest, and neural networks. The ML training component may utilize at least one of the following clustering methods: k-means, k-medoids, expectation-maximization, agglomerative clustering, and nonparametric Bayesian models. The ML training component may utilize at least one of the following feature selection and feature engineering processes: information gain, chi-square, principal component analysis, and filter and wrapper feature selection methods. The ML training component may utilize at least one the following ensemble methods and models: bagging, boosting, gradient boosting machine, and random forests. The ML training component may utilize at least one of the following time series analyses: multivariate time series analysis, hidden Markov models, and nonparametric Bayesian models. The ML training component system may utilize at least one of the following large-scale or big data analyses: autoregressive integrated moving average (ARIMA), multivariate time series analysis, hidden Markov models, nonparametric Bayesian models, autoregressive conditional heteroskedasticity (ARCH), exponentially weighted moving average, and generalized autoregressive conditional heteroskedasticity (GARCH). The ML training component may utilize at least one of the following large-scale or big data analyses: Hadoop MapReduce, Spark, approximation, and locality sensitivity hashing.

In regards to the assessment of "the positivity" or "the negativity" of a P+A activity results in relation to a client parameter, this may be determined by the ML training component though a set of pre-determined rules, set points, or priorities, such as analyzing a P+A activity by cost, time to complete, or by a detection limit. Such settings may be imported from external sources of information, such as a regulation or law, or may be manually set by a client. In one or more instances, there may be a one-time or multi-period manual intervention into the AI system to provide manual guidance for the determination of one or more P+A activities. For example, for a given well, the P+A activities may be assessed by a client as "negative" towards initial overall P+A project costs but "positive" towards regulatory compliance, post-P+A maintenance costs, and emissions results. Such manual guidance may raise the overall confidence level of the ML training component and assist in the rebalancing of the one or more client weighting factors for client parameters.

Positivity or negativity may be considered a measure of the outcome, and success can be determined by adherence to standards, by meeting a cost objective, and/or other means. In some examples, different factors related to positivity or negativity may be weighted differently, such as by different entities (e.g., clients that use techniques described herein). A positive P+A might be one that does not leak but has otherwise failed to meet the cost standard. Such an outcome is a statistical occurrence and one of the objectives of techniques described herein is to predict when that anomaly might occur. A client might elect to weight the cost (e.g., 3X for a specific set of circumstances, 10× for another) or success (e.g., 0.5X) score based on current experience and, over time, the client may elect to adjust that weighting based on results and/or deep data analysis.

The ML training component determines the client weighting factors for client parameters using collectively both client and non-client data for all wells that have had P+A activities undertaken as well as historical, public, and synthetic information (if available) in order to score and rank each of the client parameters with an overall client weighting factor. This is to ensure that the largest possible accumulation of data available for wells with P+A activity are incorporated into client weighting factors utilized by the ML model. As well, utilizing the largest data set feasible—including client and non-client data—may also provide important information about rare occurrences and risk factors associated with certain combinations of well characteristics and P+A activities that may not have been observed by the client in its P+A activities. The ML training component may be directed to analyze the data set activity with a set of pre-determined priorities, such as deriving maximum benefit of certain P+A activity-related client parameters with a minimum cost value when convolved with specific attributes of a well. It is appreciated by one of ordinary skill that as part of working with a ML training component that other priorities and associations may be made and preferred, such as safety to workers, reliability of the solution provided, and minimizing future emissions. The predicted P+A results using the tuned client weighting factors for client parameters are then compared to the actual P+A results present in both the client and non-client data for all wells that have had P+A activities undertaken. This comparison permits the derivation of an overall confidence score for the predictive capability of the AI system given a set of facts about the well being analyzed for P+A activities and the potential P+A solutions provided.

In one or more embodiments, based upon the determination made by the ML training component, the AI system may recognize a need for and recommend the creation of a new client parameter. The AI system may recognize through pattern recognition, clustering, or other analysis that there is a positive or negative relationship with an attribute in both the client and non-client data for all wells that have had P+A activities undertaken that heretofore was unrecognized but was mathematically determined to have a correlation with a positive P+A activity result. In one or more embodiments, the AI system may present the new client parameter along with a proposed initial client weighting factor for the proposed client parameter.

According to one or more embodiments, the ML training component may perform certain functions, including importation of accessible, genericized non-client data for all wells that have had P+A activities undertaken, the historical information, the public information, and determination and revision of the client weighting factor for each client parameter during an offline period or at the time before a query run is about to occur. Doing so will ensure that the client is using as recent a set of information as is feasible, including potentially updated and new information from non-client data pool sources. In one or more embodiments, the ML training component may perform this activity during a process query.

Upon completion of determining a set of client weighting factors for one or more client parameters, the ML training component may provide the set of the client weighting factors to the AI system 250 through client weighting factors 254. This permits the ML model to utilize the client weighting factors when directed by the AI system to perform a determination of client wells for P+A activities.

It is noted that certain functions described as being performed by the ML training component may alternatively be performed by one or more other components. For example, data used to train a machine learning model may be retrieved and/or processed by one or more other components, and the ML training component may then use that retrieved and/or processed data to train the machine learning model. In some embodiments, client weighting factors are determined by one or more other components, such as a user preference component, and are used to select options for inclusion in determinations of client wells for P+A activities (e.g., separately from the training of one or more machine learning models).

In certain embodiments, AI system 250 comprises one or more machine learning models, as described in more detail below with respect to FIG. 5. In one example, a bagging or boosting ensemble model is trained using one-hot encoded vectors representing features extracted from various sources as described herein. In another example, a deep learning model is trained using feature vectors (e.g., which may include one-hot encoded vectors, embeddings, and/or the like) representing features extracted from various sources as described herein. For example, the client weighting factors discussed above may be parameters of such a bagging ensemble model, boosting ensemble model, and/or deep learning model that are learned as part of a training process.

In certain embodiments, AI system 250 includes one or more models that are pre-trained (e.g., by a third party), such as in addition to one or more models that are trained as described herein. Furthermore, some embodiments may involve fine-tuning one or more pre-trained models. In some embodiments, the term "training" as used herein may refer to fine-tuning of a model that has previously been trained.

Data storage and/or processing associated with model training and/or fine-tuning may be performed in a manner that preserves privacy of underlying data as needed. In some cases, a model may first be trained using publicly available data, and the model may then be fine-tuned using private data in a manner that does not expose the private data to unauthorized access, such as by fine-tuning the model on private computing systems and/or through federated learning.

In one example, publicly available data is gathered and stored in a cloud data warehouse, cloud storage solution, or other storage location, and one or more cloud-based machine learning platforms are used to train one or more machine learning models on the public data. This technique offers scalable compute resources and can handle large data sets effectively. Once trained, the model(s) can be deployed on the cloud (e.g., on one or more cloud servers), thereby allowing for easy access, scalable application programming interface (API) endpoints, and robust service management. As more public data becomes available, the model may be re-trained as needed in the cloud, with the cloud platform facilitating automated training pipelines.

In some embodiments, a model (e.g., trained on public data as explained above) is then trained or fine-tuned using private data, such as proprietary or otherwise sensitive data associated with individual entities, such as organizations. In one example, individual organizations download the pre-trained model and fine-tune the model using their private data on their local computing infrastructure. For example, an organization may perform fine-tuning of a model on one or more computing systems within the organization's private network using private data that does not need to leave the organization's private network at any point. This ensures that private data is not exposed to unauthorized access.

In other embodiments, a federated learning technique is used to train and/or fine tune a model. For example, multiple entities may share their private data (e.g., private training data or model parameters, such as model gradients, determined through local training based on private training data) in a secure manner (e.g., using encrypted communications) with a central server, which may be cloud-based or on-premises. The central server may aggregate the private data received from the multiple entities to produce a global model, such as by aggregating model parameters received from the multiple entities or by training or fine-tuning a model using private training data received from the multiple entities. The global model may be based on the private data from the multiple entities in the sense that it includes parameters that are based on private training data from the multiple entities, but the private data itself cannot be determined from the global model. For example, the global model may be generated in such a manner as to ensure that the private data from the multiple entities cannot be reverse-engineered from the parameters of the global model (i.e., the contributions of the multiple entities to the global model cannot be discerned based on the global model). The global model may then be sent back to the multiple entities, such that each entity can benefit from the collective intelligence of all the entities without any entity's private data being exposed to any other entity. Once a model is trained and/or fine-tuned based on private data from one or more entities, the model may be deployed locally within the one or more entities' private infrastructures, ensuring data privacy during inference. In other embodiments, a global model determined through federated learning may be deployed on the cloud, as the privacy of the underlying private training data is not compromised by public use of the global model.

In some cases, a combination of public and private training/inference is utilized. For example, a public model may be trained based on public data and deployed to the cloud, and the public model may be fine-tuned based on private data in one or more of the manners described above. Using a combination of public and private training/inference is beneficial in that it leverages the scalability and flexibility of cloud resources while ensuring that models benefit from the wealth of publicly available data, while also respecting data privacy concerns by allowing entities to benefit from the intelligence of a global model (e.g., generated through using federated learning to fine-tune a public model) without compromising their proprietary data. Decentralized approaches (e.g., fine-tuning models using local infrastructure of individual entities) are particularly advantageous for companies operating in regions with stringent data protection regulations and/or for industries where data confidentiality is paramount.

FIG. 3 provides a schematic diagram of several data pools that are potentially accessible to an AI system and that relate to P+A activities. The data pools 300 each represent varying levels of accessibility and a variety of content. For the sake of clarity, only several arrows are shown for discussion purposes in FIG. 3 to assist in describing the exchange (or lack thereof) of data, which makes up an available pool of data that an AI system may draw from. One of ordinary skill in the art appreciates that there are a variety of variations in combination of data sharing and relationships that may be present and are fully contemplated. A "data pool" represents one or more sources or collections of information or data. Accessibility to one portion of a given data pool typically implies access to all portions of the same data pool, but as will be discussed there may be certain restrictions in a given implementation.

From a data pool, an AI system (not shown) may import such information collections as provided in a data pool, such as data pool 302, to develop, train, or enhance a ML model (not shown) and the associated ML training component, such as ML Training Component ML1. Importation and manipulation of data for use by an AI system from a data pool may be similar or the same as previously described in association with the systems and processes described in FIGS. 1 and 2.

As previously described, a client may import accessible, genericized non-client data for all wells that have had P+A activities undertaken through a data pool. A client may also contribute their own client data for all wells that have had P+A activities undertaken in an accessible, genericized format to non-clients through a data pool. Referring back to FIG. 2, client data for all wells that have had P+A activities undertaken 222 may undergo a genericizing process 228 on the data set to create a set of accessible, genericized data for all wells that have had P+A activities undertaken. During genericization, the data is not only made ready for export into a given pool, such as by pre-formatting certain information into a form set out by the guidelines of using the particular data pool, but also by removing all attributing information from the data. For example, the genericizing process 228 may strip corporate names, project identifiers, and other information that may reveal from whom the information originated. Only information regarding the technical and financial aspects of the P+A activity that would be useful to another client that is using the same data pool is provided in some embodiments. In one or more embodiments, the genericizing process may mark or indicate with whom the genericized client data may not be shared with, that is restricted from accessing even if part of the data pool. In export process 230, the accessible, genericized client data for all wells that have had P+A activities undertaken is provided to another client that has access to the data pool from and that is requesting updated information from the data pool.

Returning to FIG. 3, data pool 302 is the smallest collective data pool of those depicted. An AI system (not shown) provides accessible P+A data to ML Training Component ML1 using data pool 302. Data pool 302 comprises three accessible information collections for ML Training Component ML1 to train one or more models. "H" represents publicly available information. "H" may represent, for example, access to "open" historical sources of data, such as information found on the Internet or other widely available and accessible systems and resources. "H" may also represent access to "closed" sources of historical information, such as university or subscription archives, that are otherwise accessible to the public through a grant of permission or through a license. For example, useful historical information may include pricing of natural gas and crude oil sold at the wellhead, such as the West Texas Intermediate Crude (WTI) from the Chicago Board of Trade (CBOT), or the Consumer Pricing Index (CPI) for one or more periods. Such information may permit an AI system to normalize data, such as pricing information, which may be provided in actual amounts but paid during different periods, requiring adjustment to normalize.

For example, financial information may be automatically updated, such as with a staging area, based sources of cost estimates, regulatory/environmental assumptions, and other sources. One embodiment involves the use of a template (e.g., customized by the individual or company) which has the sequence of activities expressed, and the time and services/materials needed are calculated, thus creating a pricing worksheet. One or more machine learning models may develop the operations sequence and calculate the expected time/materials, whereupon the operator (user) can use their own cost basis to complete the worksheet. Other implementations are possible.

"P" represents publicly available P+A well data. Although "P" may be viewed as a subset in some sense to "H", "P" is intended to be more specific as a focus on detailed well-related information associated with hydrocarbon-producing wells, and especially wells that are no longer producing hydrocarbons. For example, one of skill in the art appreciates that there are not only abandoned wells (those wells that have undergone the proper P+A procedure and are no longer producing) but also "orphan" wells—for example but not limited to formerly producing hydrocarbon wells that are no longer producing and have not for some period of time, such period is variable based on local regulatory policy and guidelines, and having no evident legal entity with responsibility for their decommissioning. Orphan wells are appreciated to have not been properly plugged and abandoned yet, or, while having been P+A in the past, are now leaking due to the P+A process having failed over time. Such wells may represent a significant risk to the surrounding environment. "P" therefore, in part, represents a collection of information on either or both abandoned or orphan wells that may be available through local, state, or national governments. One example of a government agency that may retain, update, and make available information in its locality is the Texas Railroad Commission (TRRC).

"S" represents synthetic P+A well data. Synthetic P+A well information may originate from a variety of sources, such as universities, professional organizations, and corporations that devise computer models or programs based upon historical, scientific, and regulatory information; best and historical practices; and past-performance analysis, to derive P+A well scenarios and modeling results. Such data, although artificially derived, may provide value to the AI system. Incorporating such information into a machine learning algorithm may drive results towards cheaper, better, more modern P+A practices and potentially a greater variety of potential solutions while avoiding practices that no longer are accepted or practiced. Such information may also assist the AI in identifying problems that would be difficult to identify without such information, and may allow such problems to be brought to the attention of a client more efficiently.

Data pool 304 represents a slightly larger data pool than data pool 302. Data pool 304 comprises not only the content of data pool 302 but also data from at least one client or user. "Co" of data pool 304 represents a client that may provide a full set of accessible, genericized client data for all wells that have had P+A activities undertaken to other clients of the data pool 304 (Client—open). As previously described with processes 200, such exported, accessible, genericized client data for all wells that have had P+A activities undertaken 330A (outbound arrows) may be retained for use by others having shared access to data pool 304 or other data pool(s) to which data pool 304 is a subset member. The exported, accessible, genericized client data for all wells that have had P+A activities undertaken 330A may be retained locally, that is at a facility of "Co", or virtually, such as through a shared network, a "cloud" service, or a third-party service provider, such that other client(s) that utilize data pool 304 may readily access the data. In return, the AI system associated with ML Training Component ML2 is able to access the data pool 304 to import the information collections to develop, train, or enhance a machine learning model (not shown) utilizing ML Training Component ML2. Given the greater amount of information provided in data pool 304 versus data pool 302, one may expect that the ML model associated with ML Training Component ML2 would be more accurate, have a higher confidence in its results, potentially provide more options for performing P+A well activities, or provide a greater number of examples for investigating P+A-related actions to undertake for a given set of facts associated with a client well versus the ML model associated with ML Training Component ML 1.

Data pool 306 may conditionally represent a larger data pool than data pool 304. The reason why this is conditional is due to a potential restriction on the export of accessible, genericized client data for all wells that have had P+A activities undertaken 330B (outbound arrows with a "?") to data pool 306 by Cr. Client "Cr" (Client—restricted) is a client that provides conditionally accessible client data to data pool 306 because there may be some sort of technical, legal, corporate, or regulatory restriction on whom within data pool 306 may use the data coming from Cr. If Cr is able to take in data from the data pool that comes from Co but Co is not able to take in data from the data pool from Cr, then Co effectively has access to a data pool bound by data pool 304 and Cr effectively has access to a data pool bound by data pool 306; data pool 306 is greater than data pool 304. ML Training Component ML2 and ML Training Components ML 3 would then utilize different data pools 304, 306 for their respective client ML models. Alternatively, in an instance where there is no need for restriction on accessible, genericized client data for all wells that have had P+A activities undertaken between clients Co and Cr, data pools 304 and 306 would effectively be the same: each client Co and Cr would utilizing similar sets of data. From the perspective of Co, Co would use non-genericized Co completed P+A wells data and genericized Cr completed wells data, along with H, P, and S collective data pools. From the perspective of Cr, Cr would use non-genericized Cr completed P+A wells data and genericized Co completed wells data, along with H, P, and S collective data pools. One of ordinary skill in the art, however, would note that each AI system and ML model would still have differences due to other factors, such as the data removed by genericization, differences in client weighting factors, and use of different client parameters to interpret the collective data set.

Data pool 308 represents the largest potential data pool. "Cp" (Client—private) in this instance represents a client that is not permitted to provide any information, even in genericized form, such as genericized completed P+A wells data 330C (outbound arrows with an "X") to any member of the data pool 308, which Cp is a member. Any severe restriction, such as a government ban on export of sensitive formation data, for example but not limited to data associated with reservoir characteristics or P+A activities undertaken, outside of a client or a geographic limit, may not permit Cp to share any data with other pool participants, such as Co and Cr. However, the restriction does not block Cp from receiving information from the data pool members in data pool 308. In such an instance, ML Training Component ML 4 has access to the data from sets H, P, and S information collectives and the accessible, genericized client data for all wells that have had P+A activities undertaken from both Co and Cr.

As described in more detail below with respect to FIG. 5, ML training components ML1, ML2, ML3, ML4, and ML5 may train and/or fine-tune one or more machine learning models based on the data from data pools 302, 304, 306, and 308, and the one or more machine learning models may be added to a model zoo. For example, the model zoo may include all machine learning models that are part of an AI system described herein and that are used to predict values related to P+A activities for wells. In some embodiments, the model zoo is hosted on one or more cloud servers. In some cases, one or more machine learning models may be trained or fine-tuned and stored within the private infrastructure of an individual entity (e.g., company) rather than being included in a model zoo that is accessible to other entities. A model zoo as described herein may include, for example, one or more tree-based models, one or more regression models, one or more deep learning models (e.g., deep neural networks), one or more ensemble models (e.g., using bagging, boosting, and/or the like), and/or the like.

Figure 5:
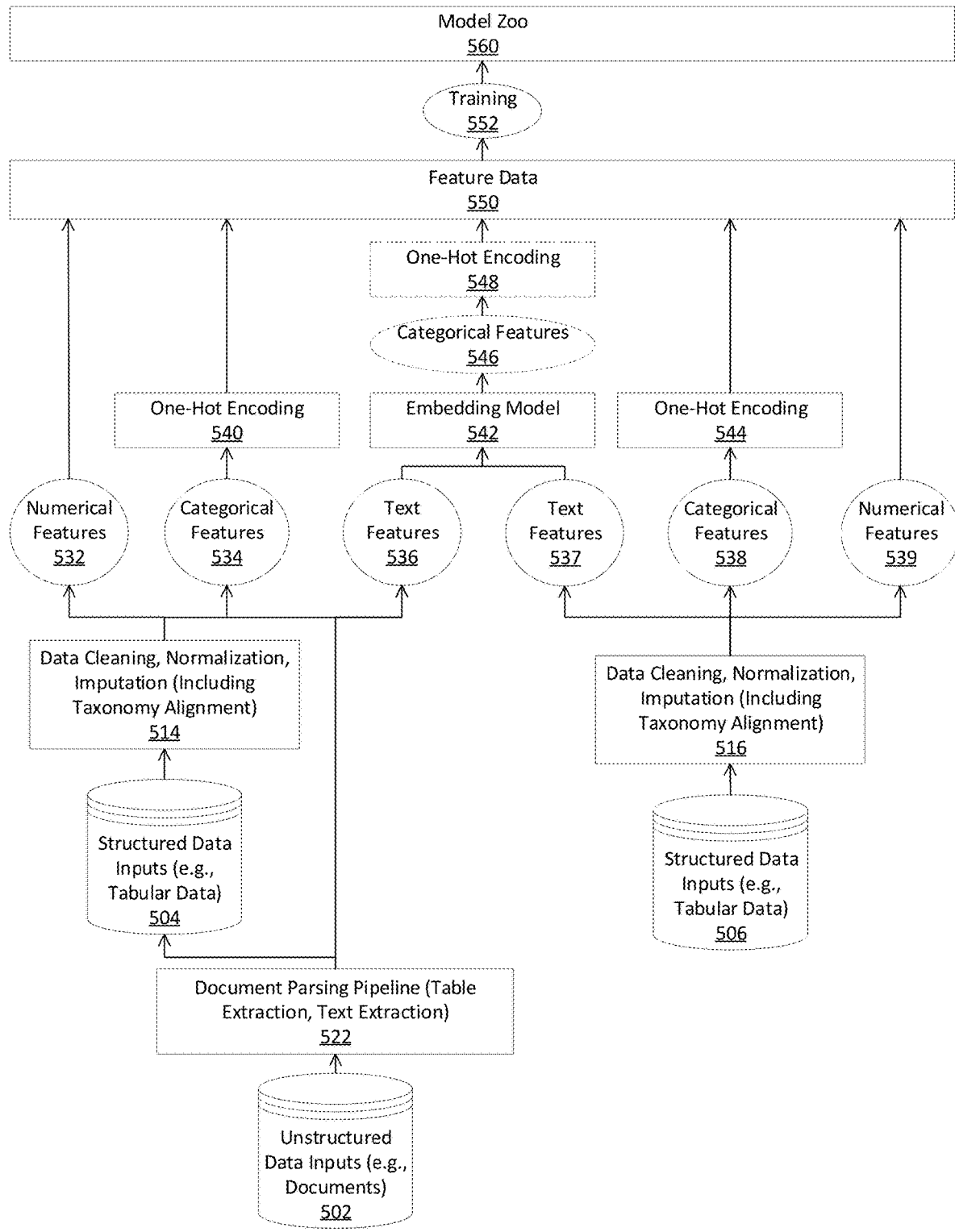
FIG. 5 is an illustration of an example related to training one or more machine learning models according to embodiments of the present disclosure.

FIG. 5 is an illustration 600 of an example related to training one or more machine learning models according to embodiments of the present disclosure.

Unstructured data inputs 502, which may include documents, generally represents data from one or more data sources (e.g., data pools 302, 304, 306, and/or 308 of FIG. 3) that does not correspond to a particular structure (e.g., tabular format). Structured data inputs 506 generally includes data from one or more data sources (e.g., data pools 302, 304, 306, and/or 308 of FIG. 3) that does correspond to a particular structure (e.g., tabular format). Examples of unstructured data include tour sheets, internal records relevant to well history (e.g., indicating significant gas migration events, vent flow issues, and/or the like), and others.

Unstructured data inputs 502 are processed through a document parsing pipeline 522, which may involve extraction of tabular data and extraction of text from documents. For example, document parsing pipeline 522 may involve the use of one or more machine learning models trained for text and/or tabular data extraction. In some embodiments, document parsing pipeline 522 further involves optical character recognition (OCR) and/or natural language processing (NLP) techniques, and/or one or more additional content extraction techniques.

Structured data inputs 504 that are extracted during document parsing pipeline 522 may undergo data cleaning, normalization, and imputation 514, which may include aligning data with one or more particular taxonomies as described above. In some embodiments, data cleaning, normalization, and imputation 514 produces one or more numerical features 532, one or more categorical features 534, and/or one or more text features 536. One or more text features 536, one or more categorical features 534, and/or one or more numerical features 532 may also be directly extracted during document parsing pipeline 522. Numerical features generally represent data features that are in numerical form (e.g., numerical values). Categorical features generally include features that indicate a particular category of a set of categories. Text features generally represent features that are in the form of text. In some embodiments, text extracted from tabular data that is not natively convertible into categorical data is processed as one or more text features 536.

Structured data inputs 506 may also undergo data cleaning, normalization, and imputation 514 in order to produce one or more text features 537, one or more categorical features 538, and/or one or more numerical features 539. Examples of structured data include tabular data received from one or more sources, such as tables defining well characteristics received from a local energy regulator.

Numerical features 532 and 539 may be used directly as feature data 550 for training 552 in order to train one or more machine learning models for inclusion in model zoo 560. Categorical features 534 and 538 may undergo one-hot encoding 540 and 544 in order to produce one-hot encoded vectors representing categorical features. Text features 536 and 537 may be processed through one or more machine learning models such as embedding model 542 in order to produce embeddings. Optionally, embeddings produced by embedding model 542 may be treated as categorical features 546 and may undergo one-hot encoding 548 in order to produce one or more one-hot encoded vectors for use as feature data 550. Alternatively, one or more embeddings produced by embedding model 542 may be used directly as feature data 550. One-hot encoded vectors produced at one-hot encoding 540, 544, and/or (optionally) 548 may be used as feature data 550 as well.

Embedding model 542 generally represents a machine learning model that has been trained to produce embeddings based on input data, such as text data. In some embodiments, embedding model 542 is fine-tuned for the particular type of text data involved herein, such as based on data from one or more data sources described herein.

Feature data 550 is used at training 552 to train and/or fine-tune one or more machine learning models. As discussed above, training 552 may involve supervised learning techniques. For example, a supervised learning technique may involve providing training inputs to a model, receiving outputs from the model in response to the training inputs, comparing the outputs from the model to labels (e.g., ground truth labels) associated with the training inputs, and iteratively adjusting one or more parameters of the model based on the comparing, such as to optimize a cost function. In certain embodiments, a mean squared error cost function is used during training 552 for training one or more machine learning models, such as for one or more regression models. In some embodiments, a vision transformer architecture is used for a machine learning model for document feature extraction. In one example, a text transformer large language model (LLM) may be used in text embedding generation (e.g., as embedding model 542).

Once one or more machine learning models in model zoo 560 have been trained, a similar process to that described with respect to FIG. 5 may be performed to generate feature data for a well that has not yet had P+A activities performed, and the feature data for such a well (e.g., similar to feature data 550) may be provided as inputs to such one or more machine learning models in order to determine predicted values related to P+A activities as described herein.

Classification models included in model zoo 560 may be trained to output confidence scores associated with predictions. Regression models included in model zoo 560 may not directly output confidence scores, but confidence intervals may be determined for predictions output by such regression models, such as based on expert analysis at the stage of utilizing these model outputs in insight generation.

In one particular example, a regression model is trained to output an estimated cement volume required for one or more P+A activities or an estimated number of work hours for one or more P+A activities to be completed. In such an example, a training data instance may include a plurality of well attributes/features (e.g., included in feature data 550), which may be examples of training inputs, associated with a label indicating a historical volume of cement that was required for one or more historical P+A activities or a historical number of work hours that were performed for one or more historical P+A activities (e.g., the label may also be determined based on values indicated in feature data 550). A plurality of such training data instances may be used to train a machine learning model through a supervised learning process to output an estimated or predicted cement volume or number of work hours for completing one or more P+A activities when the machine learning model is provided with a set of input features.

As discussed above, data that is used to generate model training data may come from a variety of sources. For example, such data may be retrieved from public datasets/information (e.g., regulators, industry data aggregators, operators, tour sheets, etc.). Examples of public datasets/information include regulatory documents and/or regulatory requirements for one or more geographic locations, data from suspended wells that are ready for abandonment (e.g., which may be ingested in any format), data from wells where P+A or repurposing is completed, specific environmental considerations, geographic information related to population and industrial surface locations, and/or the like. In another example, such data may be retrieved from private datasets/information. Examples of private datasets/information include well owner/operator files (digital, hardcopy, structured data set, and/or the like), well owner/operator policies and standards, company minimum abandonment standards, service cost information with geographic factors, and/or the like.

Outputs from one or more machine learning models in model zoo 560 may be utilized (e.g., in conjunction with input from one or more experts) to generate insights related to P+A activities. For example, while a machine learning model may output one given type of insight (e.g., estimated work hours to complete a given P+A activity), expert guidance may be used to generate a different type of insight (e.g., market rates for P+A personnel, equipment, services, and/or materials, numbers of wells in a P+A batch, changes in the regulatory landscape, and/or the like).

Figure 6:
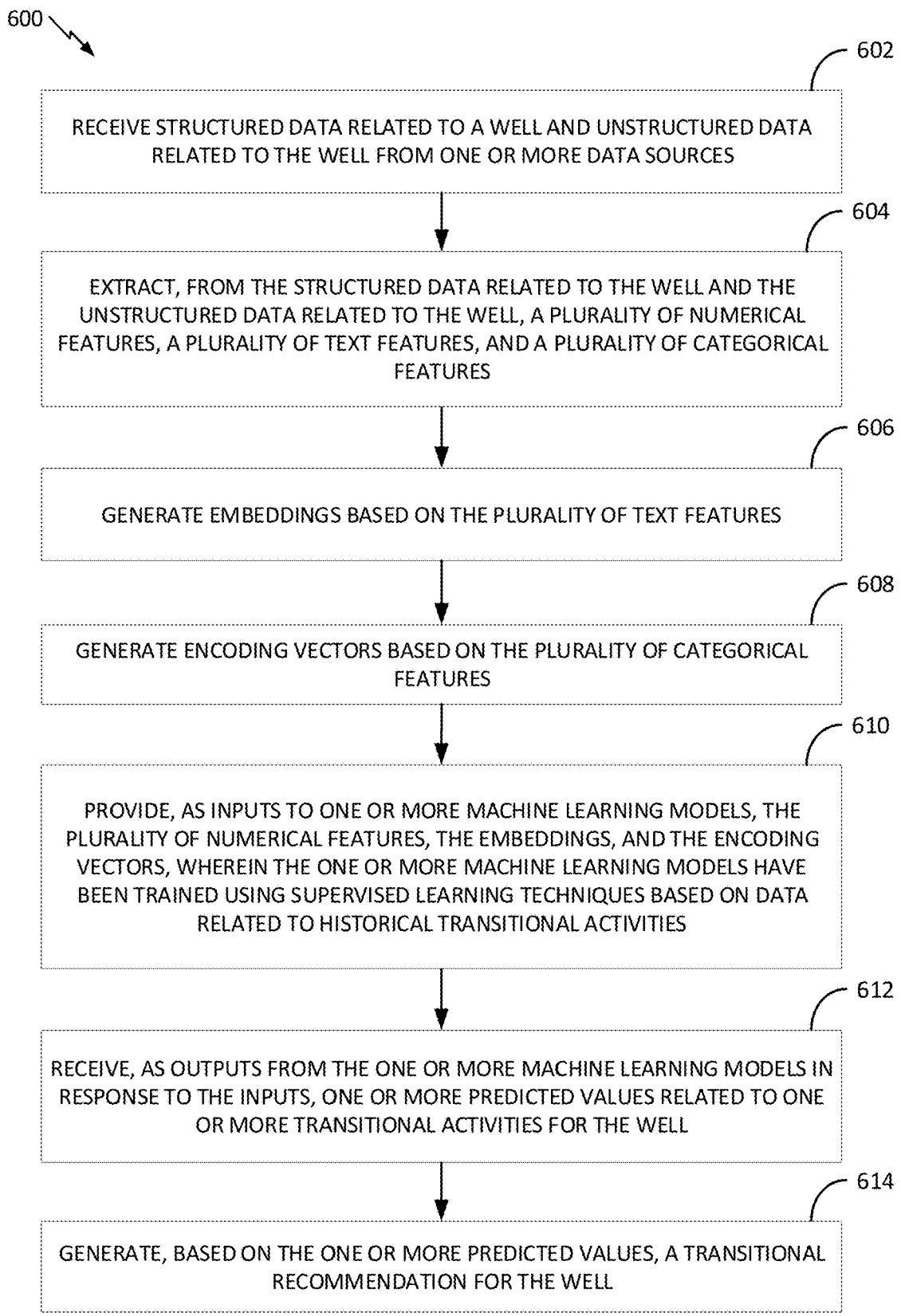
FIG. 6 depicts example operations related to using an AI system to predict values related to transitional activities for a wellbore, according to certain embodiments.

FIG. 6 depicts example operations 600 related to using an AI system to predict values related to transitional activities for a client well, according to certain embodiments. For example, operations 600 may be performed by one or more components of a computer system such as computer system 1000 of FIG. 7, discussed below.

Operations 600 begin at step 602, with receiving structured data related to a well and unstructured data related to the well from one or more data sources.

Operations 600 continue at step 604, with extracting, from the structured data related to the well and the unstructured data related to the well, a plurality of numerical features, a plurality of text features, and a plurality of categorical features.

Operations 600 continue at step 606, with generating embeddings based on the plurality of text features.

Operations 600 continue at step 608, with generating encoding vectors based on the plurality of categorical features.

Operations 600 continue at step 610, with providing, as inputs to one or more machine learning models, the plurality of numerical features, the embeddings, and the encoding vectors, wherein the one or more machine learning models have been trained using supervised learning techniques based on data related to historical transitional activities.

Operations 600 continue at step 612, with receiving, as outputs from the one or more machine learning models in response to the inputs, one or more predicted values related to one or more transitional activities for the well.

Operations 600 continue at step 614, with generating, based on the one or more predicted values, a transitional recommendation for the well.

In certain embodiments, the generating of the transitional recommendation for the well comprises applying weights to the one or more predicted values. In some embodiments, the weights were configured by a user related to the well.

In some embodiments, the one or more predicted values include one or more of: a predicted amount of a material for performing the one or more transitional activities for the well; a predicted number of working hours for performing the one or more transitional activities for the well; a predicted cost of performing the one or more transitional activities for the well; or a predicted likelihood of a risk associated with performing the one or more transitional activities for the well.

Certain embodiments further comprise receiving user feedback with respect to the transitional recommendation for the well, wherein the one or more machine learning models are retrained based on the user feedback.

In some embodiments, the extracting, from the structured data related to the well and the unstructured data related to the well, the plurality of numerical features, the plurality of text features, and the plurality of categorical features comprises performing data cleaning and normalization operations on data extracted from the structured data related to the well and the unstructured data related to the well.

In certain embodiments, the generating of the embeddings based on the plurality of text features comprises providing the plurality of text features as inputs to an embedding model and receiving the embeddings as outputs from the embedding model in response to the inputs.

In some embodiments, the generating of the encoding vectors based on the plurality of categorical features comprises generating one-hot encoded vectors.

In certain embodiments, the one or more machine learning models comprise one or more of: a deep learning model; a regression model; or an ensemble model.

In some embodiments, the one or more machine learning models comprise at least one machine learning model that was trained using a federated learning process based on private information associated with a plurality of entities.

In certain embodiments, the one or more machine learning models comprise at least one machine learning model that was trained within a private computing environment associated with a particular entity using private information associated with the particular entity.

In some embodiments, the structured data related to the well comprises tabular data.

In certain embodiments, the unstructured data related to the well comprises one or more documents.

In some embodiments, the one or more transitional activities comprise one or more of: plugging and abandonment (P+A) activities; re-use activities; or repurposing activities.

Figure 7:
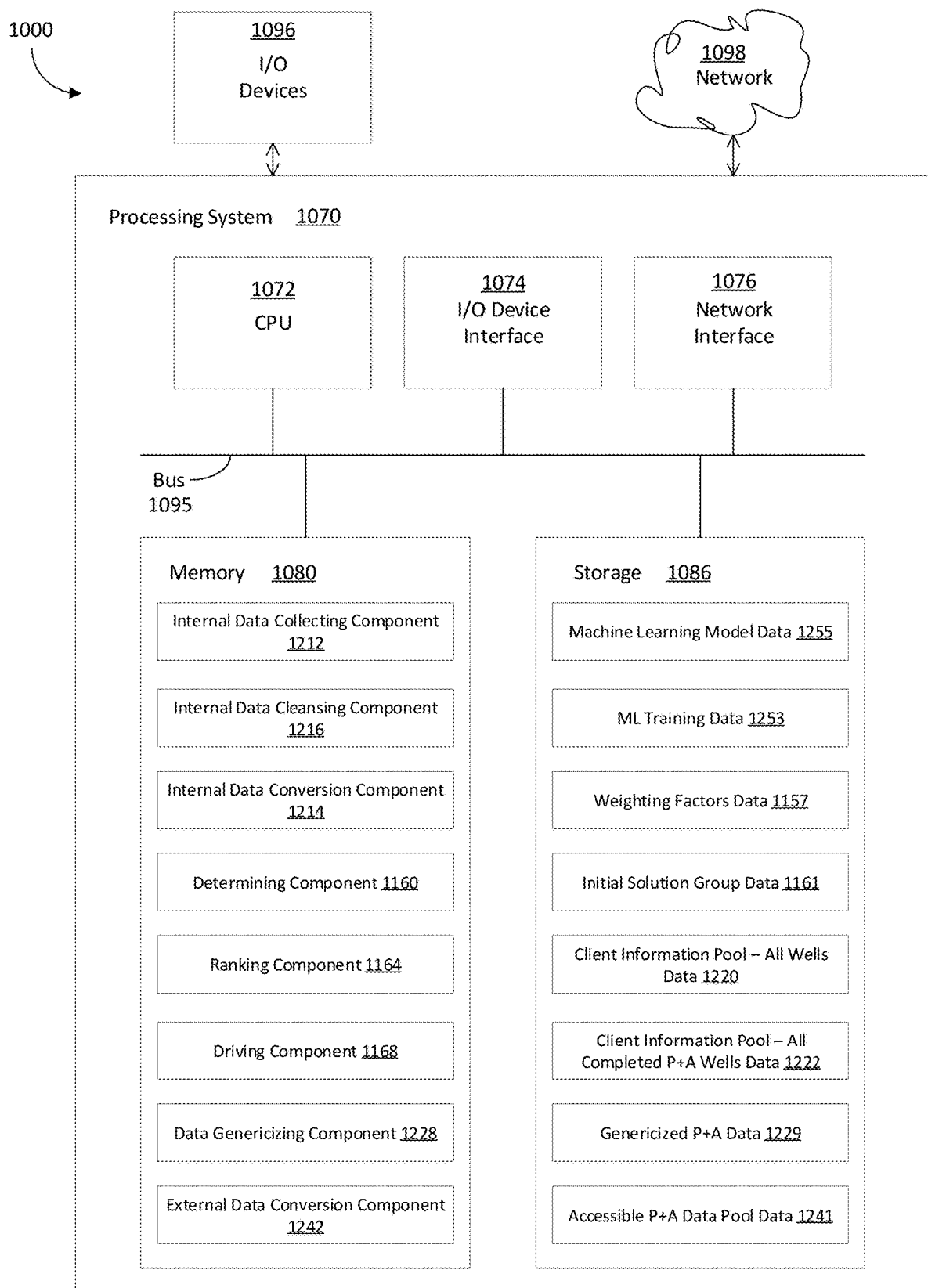
FIG. 7 depicts a block diagram of a computer system regarding transitional activities for a wellbore, according to one or more embodiments.

FIG. 7 depicts a block diagram of an embodiment computer system regarding transitional activities. Embodiment computer system 1000 may be utilized to provide computational functionalities associated with one or more embodiment described algorithms, methods, functions, processes, flows, and procedures as described in this disclosure. Embodiment computer system 1000 may include a processing system 1070. In one or more embodiments, the processing system 1070 may interact with or host applications and functionalities associated with an AI system, such as AI system 150 provided in FIG. 1. An embodiment processing system may be configured to operate one or more embodiments systems as previously described to perform one or more steps of one or more embodiment methods and processes as described and to be described.

The processing system 1070 is intended to encompass any computing device, such as a server, a desktop computer, a laptop/notebook computer, a wireless data port, a smart phone, a personal digital assistant (PDA), a tablet computing device, or one or more processors within these devices, including physical instances, virtual instances, such as "the cloud" or as part of a software as a service (SaaS) platform, or both. One or more embodiment processing system may include input devices such as keypads, keyboards, and touch screens that can accept user information. One or more embodiment processing systems may include output devices that can convey information associated with the operation of the processing system. Such information may include digital data, visual data, audio information, or a combination of information. The information can be presented in a graphical user interface (UI) (or GUI).

One or more embodiment processing systems may serve in a role of a client, a network component, a server, a database, a persistency, or components of a computer system for performing the subject matter described in this disclosure. The illustrated processing system 1070 in FIG. 7 is communicably coupled with a network 1098. In one or more embodiments, one or more components of the processing system may be configured to operate within different environments, including cloud-computing-based environments, local environments, global environments, and combinations of environments.

At a high level, the one or more embodiment processing systems is an electronic computing device configured to receive, transmit, process, store, and manage data and information associated with the described subject matter. According to one or more embodiments, the processing system may also include, or be communicably coupled with, an application server, an email server, a web server, a caching server, a streaming data server, or a combination of servers.

The one or more embodiment processing systems may receive requests over network 1098 from a client application, for example, a program executing on another computer. The processing system may respond to the received requests by processing the received requests using one or more software applications. Requests can also be sent to the embodiment processing system from internal users, for example, from a command console, external or third parties, automated applications, entities, individuals, systems, and computers.

Processing system 1070 may include a central processing unit (CPU) 1072. In one or more embodiments, the CPU 1072 is configured to process computer-executable instructions that are stored in memory 1080 or are retrieved from storage 1086 into memory 1080. Processing of computer-executable instructions causes the computer system 1000 to perform or transmit instruction to other devices to perform using algorithms, methods, functions, processes, flows, or procedures one or more steps of the one or more embodiment methods and processes described. Instances of the CPU may include a single CPU, multiple CPUs, a single CPU having multiple processing cores, and other forms of processing architecture configured to execute computer-executable instructions.

Each of the components of the processing system 1070 may communicate using a system bus 1095. In one or more embodiments, any or all of the components of the processing system 1070, including hardware or software components, may interface with each other or the input/output (I/O) interface 1074, or a combination of both, utilizing the system bus 1095.

Computer system 1000 may include I/O device(s) 1096 coupled to processing system 1070 in one or more embodiments. In such embodiments, the processing system 1070 may include an I/O interface 1074. Although illustrated as a single interface, two or more interfaces may be used according to particular needs, desires, or particular implementations of the processing system 1070 and the described functionality. The I/O interface 1074 may allow processing system 1070 to communicate with one or more input/output devices 1096, such as keyboards, displays, mouse devices, pen input, and other HMI (human machine interface) devices that are configured for interpreting human or other computer interaction to or from processing system 1070. Note that processing system 1070 may connect with external I/O devices, for example, an external display device, through either or both physical or non-physical, for example, wireless couplings or connections.

Processing system 1070 in one or more embodiments may further include a network interface 1076. Network interface may be used by the processing system for communicating with other systems that are connected to the network (whether illustrated or not) in a distributed environment. Generally, the network interface may include, or be implemented using, logic encoded in software, hardware, or a combination thereof configured to communicate with the network. More specifically, the network interface may include software supporting one or more communication protocols associated with communications. As such, the network or the hardware for the network interface may be configured to communicate physical signals within and outside of the illustrated computer system 1000.

In one or more embodiments, the interfaces of the processing system, such as processing system 1070, may use an application programming interface (API), a service layer, or a combination thereof. The API may include specifications for routines, data structures, and object classes. The API may be either computer-language independent or dependent. The API may refer to a complete interface, a single function, or a set of APIs.

The service layer may provide software services to the processing system 1070 and other components (whether illustrated or not) that are communicably coupled to the processing system 1070. The functionality of the processing system 1070 may be accessible for all service consumers using this service layer. Software services, such as those provided by the service layer, may provide reusable, defined functionalities through a defined interface. For example, the interface may be software written in JAVA, C++, or a language providing data in extensible markup language (XML) format. While illustrated as an integrated component of the processing system 1070, in one or more implementations, the API or the service layer may be stand-alone components in relation to other components of the processing system 1070 and other components communicably coupled to the processing system 1070. Moreover, any or all parts of the API or the service layer may be implemented as child or sub-modules of another software module, enterprise application, or hardware module without departing from the scope of the present disclosure.

In one or more embodiments, the processing system 1070 further includes memory 1080. Residing actively within memory 1080 may include, but is not limited to, functional components and applications for performing the aforementioned and to describe one or more embodiment methods and process. Examples of functional components include, but are not limited to, an internal data collecting component 1212, an internal data cleansing component 1216, an internal data conversion component 1214, a determining component 1160, a ranking component, 1164, a data genericizing component 1228, an external data conversion component 1242, and a driving component 1168, for performing operations described in connection with methods and processes provided for in FIGS. 1, 2, 3, 4, and 5.

Applications may be an algorithmic software engine providing functionality according to particular needs, desires, or particular implementations of the processing system and the described functionality. For example, an application may serve as one or more components, modules, or applications. Further, an application may be implemented as a single or multiple applications on the processing system. The application may operate internal to the computer, external to the computer, or a combination thereof.

Note that while shown as a single memory 1080 in FIG. 7 for the sake of simplicity, the various functions and applications accessible in memory may be stored in different physical memories, including memories remote from processing system but accessible by CPU via internal data connections, such as bus, or via external data connections, such as network interface or I/O device interface. Two or more memories of the same, different, or combinations thereof may be used according to particular needs, desires, or particular implementations of the processing system and the described functionality.

In one or more embodiments, the processing system 1070 further includes storage 1086. Storage 1086 may retain permanently instructions for functional components and applications for performing the aforementioned and to be describe one or more embodiment methods and process. Storage 1086 further includes, but is not limited to, retaining at any given time parts of or an entirety of data associated with machine learning model data 1255, ML training data 1253, weighing factors data 1157, initial solution group data 1161, client information pool for all wells data 1220, client information pool all completed P+A wells data 1222, genericized P+A data 1229, and accessible P+A pool data 1241, for performing one or more of the operations previously described. As would be appreciated by one of ordinary skill, other data and aspects may be included in physical storage.

Note that while shown as a single storage in FIG. 7 for the sake of simplicity, the various function and applications accessible in storage 1086 may be stored in different physical storages, including storages remote from processing system but accessible by CPU via internal data connections, such as bus, or via external data connections, such as network interface or I/O device interface. Two or more storages of the same, different, or combination thereof, may be used according to particular needs, desires, or particular implementations of the processing system and the described functionality.

The storage may also include a database structure or format that may hold data for the process system 1070 and other components connected to the network 1098 (whether illustrated or not). For example, a database may be an in-memory, conventional, or a database storing data consistent with the present disclosure. In one or more embodiments, a database be a combination of two or more different database types, for example, hybrid in-memory and conventional databases, according to particular needs, desires, or particular implementations of the process system and the described functionality. A single or a plurality of databases of the same, different, or a combination thereof, may be used according to particular needs, desires, or particular implementations of the process system and the described functionality.

The process system may also include a power supply. The power supply may include a rechargeable or non-rechargeable battery that may be configured to be either user- or non-user-replaceable. In one or more embodiments, the power supply may include power-conversion and management circuits, including recharging, standby, and power management functionalities. In one or more embodiments, the power supply may include a power plug to allow the process system to be plugged into a wall socket or a power source to, for example, power the process system while concurrently or separately recharging a rechargeable battery.

There may be any number of process systems associated with, or external to, a computer system 1000 containing process system 1070, with each process system communicating over network 1098. Further, the terms "client," "user," and other appropriate terminology may be used interchangeably, as appropriate, without departing from the scope of the present disclosure. Moreover, the present disclosure contemplates that many users may use one process system and one user may use multiple process systems.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional) to achieve desirable results. In certain circumstances, batch processing, multitasking or parallel processing (or a combination of batch, multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperability coupled with a hardware processor configured to perform the computer-implemented method or the instructions stored on the non-transitory, computer-readable medium.

While the various steps in an embodiment method or process are presented and described sequentially, one of ordinary skill in the art will appreciate that some or all of the steps may be executed in different order, may be combined or omitted, and some or all of the steps may be executed in parallel. The steps may be performed actively or passively. The method or process may be repeated or expanded to support multiple components or multiple users within a field environment. Accordingly, the scope should not be considered limited to the specific arrangement of steps shown in a flowchart or diagram.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise. Within a claim, reference to an element in the singular is not intended to mean "one and only one" unless specifically so stated, but rather "one or more." Unless specifically stated otherwise, the term "some" refers to one or more.

Embodiments of the present disclosure may suitably "comprise", "consist", or "consist essentially of" the limiting features disclosed and may be practiced in the absence of a limiting feature not disclosed. As used here and in the appended claims, the words "comprise," "has," and "include" and all grammatical variations thereof are each intended to have an open, non-limiting meaning that does not exclude additional elements or steps.

"Optional" and "optionally" means that the subsequently described material, event, or circumstance may or may not be present or occur. The description includes instances where the material, event, or circumstance occurs and instances where it does not occur.

As used, the term "determining" encompasses a wide variety of actions. For example, "determining" may include calculating, computing, processing, deriving, investigating, looking up (for example, looking up in a table, a database or another data structure), and ascertaining. Also, "determining" may include receiving (for example, receiving information) and accessing (for example, accessing data in a memory). Also, "determining" may include resolving, selecting, choosing, and establishing.

When the words "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

As used, terms such as "first" and "second" are arbitrarily assigned and are merely intended to differentiate between two or more components of a system, an apparatus, or a composition. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the various embodiments described.

Although only a few example embodiments have been described in detail, those skilled in the art will readily appreciate that many modifications are possible in the example embodiments without materially departing from the disclosed scope as described. Accordingly, all such modifications are intended to be included within the scope of this disclosure as defined in the following claims. In the claims, means-plus-function clauses are intended to cover the structures described as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f), for any limitations of any of the claims, except for those in which the claim expressly uses the words 'means for' together with an associated function.

The following claims are not intended to be limited to the embodiments provided but rather are to be accorded the full scope consistent with the language of the claims.

What is claimed is:

1. A method executed by one or more processors for determining one or more attributes in relation to transitional activities for a client well, the method comprising:

receiving structured data related to a well and unstructured data related to the well from one or more data sources;

extracting, from the structured data related to the well and the unstructured data related to the well, a plurality of numerical features, a plurality of text features, and a plurality of categorical features;

generating embeddings based on the plurality of text features;

generating encoding vectors based on the plurality of categorical features;

providing, as inputs to one or more machine learning models, the plurality of numerical features, the embeddings, and the encoding vectors, wherein the one or more machine learning models have been trained using supervised learning techniques based on data related to historical plugging and abandonment (P+A) activities, historical re-use activities, or historical repurposing activities;

receiving, as outputs from the one or more machine learning models in response to the inputs, one or more predicted values related to one or more transitional activities for the well, wherein the one or more transitional activities for the well comprise one or more P+A activities for the well, one or more re-use activities for the well, or one or more repurposing activities for the well, and wherein the one or more predicted values include one or more of:

a predicted amount of a material for performing the one or more transitional activities for the well;

a predicted number of working hours for performing the one or more transitional activities for the well;

a predicted cost of performing the one or more transitional activities for the well; or a predicted likelihood of a risk associated with performing the one or more transitional activities for the well; and generating, based on the one or more predicted values, a transitional recommendation for the well, wherein the transitional recommendation comprises a recommendation to perform a P+A activity for the well, a re-use activity for the well, or a repurposing activity for the well.

2. The method of claim 1, wherein the generating of the transitional recommendation for the well comprises applying weights to the one or more predicted values.

3. The method of claim 2, wherein the weights were configured by a user related to the well.

4. The method of claim 1, further comprising receiving user feedback with respect to the transitional recommendation for the well, wherein the one or more machine learning models are retrained based on the user feedback.

5. The method of claim 1, wherein the extracting, from the structured data related to the well and the unstructured data related to the well, the plurality of numerical features, the plurality of text features, and the plurality of categorical features comprises performing data cleaning and normalization operations on data extracted from the structured data related to the well and the unstructured data related to the well.

6. The method of claim 1, wherein the generating of the embeddings based on the plurality of text features comprises providing the plurality of text features as inputs to an embedding model and receiving the embeddings as outputs from the embedding model in response to the inputs.

7. The method of claim 1, wherein the generating of the encoding vectors based on the plurality of categorical features comprises generating one-hot encoded vectors.

8. The method of claim 1, wherein the one or more machine learning models comprise one or more of:

a deep learning model;

a regression model; or an ensemble model.

9. The method of claim 1, wherein the one or more machine learning models comprise at least one machine learning model that was trained using a federated learning process based on private information associated with a plurality of entities.

10. The method of claim 1, wherein the one or more machine learning models comprise at least one machine learning model that was trained within a private computing environment associated with a particular entity using private information associated with the particular entity.

11. The method of claim 1, wherein the structured data related to the well comprises tabular data.

12. The method of claim 1, wherein the unstructured data related to the well comprises one or more documents.

13. A system for determining one or more attributes in relation to transitional activities for a client well, the system comprising:

one or more processors; and a memory comprising instructions that, when executed by the one or more processors, cause the system to:

receive structured data related to a well and unstructured data related to the well from one or more data sources;

extract, from the structured data related to the well and the unstructured data related to the well, a plurality of numerical features, a plurality of text features, and a plurality of categorical features;

generate embeddings based on the plurality of text features;

generate encoding vectors based on the plurality of categorical features;

provide, as inputs to one or more machine learning models, the plurality of numerical features, the embeddings, and the encoding vectors, wherein the one or more machine learning models have been trained using supervised learning techniques based on data related to historical plugging and abandonment (P+A) activities, historical re-use activities, or historical repurposing activities;

receive, as outputs from the one or more machine learning models in response to the inputs, one or more predicted values related to one or more transitional activities for the well, wherein the one or more transitional activities for the well comprise one or more P+A activities for the well, one or more re-use activities for the well, or one or more repurposing activities for the well, and wherein the one or more predicted values include one or more of;

a predicted amount of a material for performing the one or more transitional activities for the well;

a predicted number of working hours for performing the one or more transitional activities for the well;

a predicted cost of performing the one or more transitional activities for the well; or a predicted likelihood of a risk associated with performing the one or more transitional activities for the well; and generate, based on the one or more predicted values, a transitional recommendation for the well, wherein the transitional recommendation comprises a recommendation to perform a P+A activity for the well, a re-use activity for the well, or a repurposing activity for the well.

14. The system of claim 13, wherein the generating of the transitional recommendation for the well comprises applying weights to the one or more predicted values.

15. The system of claim 14, wherein the weights were configured by a user related to the well.

16. The system of claim 13, wherein the instructions, when executed by the one or more processors, further cause the system to receive user feedback with respect to the transitional recommendation for the well, wherein the one or more machine learning models are retrained based on the user feedback.

17. A non-transitory computer readable medium comprising instructions that, when executed by one or more processors of a computing system, cause the computing system to:
receive structured data related to a well and unstructured data related to the well from one or more data sources;
extract, from the structured data related to the well and the unstructured data related to the well, a plurality of numerical features, a plurality of text features, and a plurality of categorical features;
generate embeddings based on the plurality of text features;
generate encoding vectors based on the plurality of categorical features;
provide, as inputs to one or more machine learning models, the plurality of numerical features, the embeddings, and the encoding vectors, wherein the one or more machine learning models have been trained using supervised learning techniques based on data related to historical plugging and abandonment (P+A) activities, historical re-use activities, or historical repurposing activities;
receive, as outputs from the one or more machine learning models in response to the inputs, one or more predicted values related to one or more transitional activities for the well, wherein the one or more transitional activities for the well comprise one or more P+A activities for the well, one or more re-use activities for the well, or one or more repurposing activities for the well, and wherein the one or more predicted values include one or more of:
a predicted amount of a material for performing the one or more transitional activities for the well;
a predicted number of working hours for performing the one or more transitional activities for the well,
a predicted cost of performing the one or more transitional activities for the well; or
a predicted likelihood of a risk associated with performing the one or more transitional activities for the well; and
generate, based on the one or more predicted values, a transitional recommendation for the well, wherein the transitional recommendation comprises a recommendation to perform a P+A activity for the well, a re-use activity for the well, or a repurposing activity for the well.

* * * * *